United States Patent
Liberg et al.

(10) Patent No.: US 9,717,072 B2
(45) Date of Patent: Jul. 25, 2017

(54) FIRST DEVICE, SECOND DEVICE AND METHODS THEREIN FOR THE FIRST DEVICE SENDING A MODIFIED ENCODED RADIO BLOCK TO THE SECOND DEVICE

(71) Applicant: Telefonaktiebolaget L M Ericsson (publ), Stockholm (SE)

(72) Inventors: Olof Liberg, Stockholm (SE); Mårten Sundberg, Årsta (SE); John Walter Diachina, Garner, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 65 days.

(21) Appl. No.: 14/655,290

(22) PCT Filed: May 13, 2015

(86) PCT No.: PCT/SE2015/050549
§ 371 (c)(1),
(2) Date: Jun. 24, 2015

(87) PCT Pub. No.: WO2015/178827
PCT Pub. Date: Nov. 26, 2015

(65) Prior Publication Data
US 2016/0262132 A1    Sep. 8, 2016

Related U.S. Application Data

(60) Provisional application No. 62/000,018, filed on May 19, 2014.

(51) Int. Cl.
*H04W 72/04*     (2009.01)
*H04L 1/00*      (2006.01)
(Continued)

(52) U.S. Cl.
CPC .......... *H04W 72/04* (2013.01); *H04L 1/0041* (2013.01); *H04L 1/0057* (2013.01);
(Continued)

(58) Field of Classification Search
CPC ... H04L 1/1664; H04L 1/0041; H04L 1/0073; H04L 1/0061; H04L 1/0057; H04L 2001/125
See application file for complete search history.

(56) References Cited

U.S. PATENT DOCUMENTS

2008/0279211 A1*  11/2008  Chitrapu .............. H04L 1/1664
                                                          370/449
2010/0205499 A1*  8/2010  Axelsson ............. H04L 1/1614
                                                          714/748
(Continued)

FOREIGN PATENT DOCUMENTS

WO    2013070163 A1    5/2013
WO    2015068119 A1    5/2015

OTHER PUBLICATIONS

Andersson, Eva-Karin, "Användning av Fire-kod för felrättning och feluppäckt i GSM," Departement of Information Theory, Lund University, Ericsson, Document No. LR/B 94:0423, Feb. 3, 1995, 64 pages.
(Continued)

*Primary Examiner* — Jung Park
(74) *Attorney, Agent, or Firm* — Withrow & Terranova, PLLC

(57)  ABSTRACT

Method performed by a first device for sending a modified encoded radio block to a second device. The first device and the second device operate in a wireless communications network. The first device selects a set of bit positions of an encoded radio block that has the second device as intended recipient. The set of bit positions is unique to a value of an extended Temporary Flow Identifier, eTFI, assigned to the
(Continued)

second device, or the set of bit positions is unique to a case in which no eTFI has been assigned to the second device. The first device performs a modulo-2-addition of the selected set of bit positions of the encoded radio block with a pre-determined bit pattern, to obtain a modified encoded radio block. The first device sends the modified encoded radio block to the second device.

30 Claims, 19 Drawing Sheets

(51) Int. Cl.
*H04L 12/741* (2013.01)
*H04W 88/02* (2009.01)
*H04W 88/08* (2009.01)

(52) U.S. Cl.
CPC .......... *H04L 1/0082* (2013.01); *H04L 45/745* (2013.01); *H04W 72/0406* (2013.01); *H04W 88/02* (2013.01); *H04W 88/08* (2013.01)

(56) References Cited

U.S. PATENT DOCUMENTS

| | | | | |
|---|---|---|---|---|
| 2011/0194410 A1* | 8/2011 | Bergstrom | .......... | H04W 76/021 370/235 |
| 2012/0269145 A1* | 10/2012 | Widell | .................. | H04L 1/0025 370/329 |
| 2013/0235855 A1* | 9/2013 | Diachina | ........... | H04W 72/0446 370/336 |
| 2014/0064194 A1* | 3/2014 | Schliwa-Bertling | .. | H04W 28/06 370/329 |

OTHER PUBLICATIONS

Author Unknown, "Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 12)," Technical Specification 44.060, Version 12.0.0, 3GPP Organizational Partners, Mar. 2014, 631 pages.
Author Unknown, "Technical Specification Group GSM/EDGE Radio Access Network; Channel coding (Release 12)," Technical Specification 45.003, Version 12.0.0, 3GPP Organizational Partners, Nov. 2013, 325 pages.
Author Unknown, "Technical Specification Group GSM/EDGE Radio Access Network; Channel coding (Release 12)," Technical Specification 45.003, Version 12.1.0, 3GPP Organizational Partners, May 2014, 327 pages.
Author Unknown, "Technical Specification Group GSM/EDGE Radio Access Network; Radio transmission and reception (Release 12)," Technical Specification 45.005, Version 12.1.0, 3GPP Organizational Partners, Nov. 2013, 270 pages.
Telefon AB LM Ericsson et al., "GP-121118: New Work Item on support for Downlink Multi Carrier in GERAN," 3rd Generation Partnership Project (3GPP), TSG GERAN Meeting #55, Vienna, Austria, Aug. 27-31, 2012, 6 pages.
Telefon AB LM Ericsson et al., "Tdoc Gp-130662: DLMC—Extended TFI Addressing space," 3rd Generation Partnership Project (3GPP), TSG GERAN #59, Aug. 26-30, 2013, Sofia, Bulgaria, 8 pages.
Telefon AB LM Ericsson, "Gp-131125: Extended TFI Addressing space for DLMC," 3rd Generation Partnership Project (3GPP), TSG GERAN Meeting #60, Zhuhai, P.R. China, Nov. 18-22, 2013, 7 pages.
Telefon AB LM Ericsson, "Tdoc Gp-131135: DLMC—Working Assumptions (update of GP-13115)," 3rd Generation Partnership Project (3GPP), TSG GERAN Meeting #60, Zhuhai, P.R. China, Nov. 18-22, 2013, 7 pages.
Kapsch Carriercom France S.A.S. et al., "GP-130622: TCRT: Introduction of ER-GSM band," 3rd Generation Partnership Project (3GPP), TSG-GERAN1 Meeting #59, Aug. 27-29, 2013, Sofia, Bulgaria, 21 pages.
Proakis, John G. et al., "Digital Communications," McGraw-Hill Education, 5th Edition, Nov. 6, 2007, p. 475.
Ericsson, "Tdoc GP-140343: DLMC—Correction of eTFI usage in PACCH," 3rd Generation Partnership Project (3GPP) TSG GERAN#62, May 26-30, 2014, Valencia, Spain, 6 pages.
International Search Report and Written Opinion for International Patent Application No. PCT/SE2015/050549, mailed Aug. 10, 2015, 10 pages.

* cited by examiner

FIRST DEVICE, SECOND DEVICE AND METHODS THEREIN FOR THE FIRST DEVICE SENDING A MODIFIED ENCODED RADIO BLOCK TO THE SECOND DEVICE

This application is a 35 U.S.C. §371 national phase filing of International Application No. PCT/SE2015/050549, filed May 13, 2015, which claims the benefit of U.S. Provisional Application No. 62/000,018, filed May 19, 2014, the disclosures of which are incorporated herein by reference in their entireties.

TECHNICAL FIELD

The present disclosure relates generally to a first device and methods therein for sending a modified encoded radio block to a second device. The present disclosure also relates generally to the second device and methods therein for determining whether the second device is the intended recipient of the modified encoded radio block sent by the first device. The present disclosure further relates generally to computer programs and computer-readable storage mediums, having stored thereon the computer programs to carry out these methods.

BACKGROUND

Communication devices such as terminals are also known as e.g. User Equipments (UE), mobile terminals, wireless terminals and/or Mobile Stations (MS). Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Within telecommunication systems, such as within a Global System for mobile communications (GSM) Enhanced Data Rates for GSM Evolution (EDGE or EGPRS) Radio Access Network (GERAN) network, so called Packet Switched (PS) Temporary Block Flow (TBF) may be assigned to a device and used to enable transfer of user data between e.g. a Radio Base Station (RBS) and a Mobile Station (MS), such as a wireless device. In a GERAN network, a PS TBF may be assigned a Temporary Flow Identity (TFI) value.

The TFI itself is a 5-bit field encoded as a binary number in the range 0 to 31, which may be typically provided to the MS by the GERAN network upon TBF assignment. The TFI value may uniquely identify a TBF among concurrent TBFs in the same direction, UL or DL, assigned the same Packet Data Channel (PDCH) resources on the same carrier. The same TFI value may be used concurrently for other TBFs on other PDCH resources in the same direction and for TBFs in the opposite direction, hence a TFI is a unique identifier on a given PDCH resource.

A Radio Link Control Medium Access Control (RLC/MAC) block sent on a given UL/DL carrier may be associated with a certain TBF and may thus be uniquely identified by the TFI together with, in case of an RLC data block, the direction, UL or DL, in which the RLC data block is sent; and in case of a RLC/MAC control block, the direction in which the RLC/MAC control block is sent. In case Starting sequence number (SSN)-based Fast Acknowledge/Non-acknowledge (Ack/Nack) Reporting (FANR) is used, the TFI identifying the TBF being acknowledged may be included in the Piggy-backed Ack/Nack (PAN) field.

This means that, e.g., every time an MS receives a DL data block or control block on a given carrier, it may use the included TFI field to determine if the block belongs to any, there can be more than one, of the TBFs associated with that very MS. If so, the block is intended for this MS, whereupon, the corresponding payload may be decoded and delivered to upper layers, but otherwise discarded. In the UL direction, the behavior may be the same, i.e. the network may use the TFI value to identify blocks that belong to the same TBF and therefore belong to the MS assigned the use of that TBF. This is an existing mechanism that may be used in GERAN networks for facilitating the multiplexing of multiple users on the same PDCH resources on a given carrier.

The need for TFI uniqueness within the context of any given set of PDCH resources, on a given carrier, assigned to multiple MS limits the number of concurrent TBFs and thus devices that may share the same radio resources on that carrier. In case of devices supporting Downlink Multi-carrier (DLMC) mode of operation, see 3GPP TS 44.060, 3GPP; GERAN; Mobile Station (MS)—Base Station System (BSS) interface—Radio Link Control Medium Access Control (RLC/MAC) protocol, the limitation may be even more severe as each DL TBF supported using DLMC may be assigned the use of PDCH resources on multiple DL carriers. In other words, assigning a TFI that is to be unique across a set of multiple DL carriers may limit the number of devices that can share PDCH resources associated with that set of DL carriers to a greater extent compared to the case where an assigned TFI only needs to be unique within the context of each DL carrier within the same set of DL carriers. As a result of this, it was decided that the TFI addressing space used before the introduction of the DLMC feature in 3GPP GERAN Rel-12 was insufficient for supporting the DLMC feature, assuming the current and projected increase of PS traffic observed in GERAN networks over the world. See GP-130662 DLMC—Extended TFI Addressing Space, 3GPP GERAN#59, Ericsson & ST-Ericsson.

In the context of mobile stations (MS) operating in a DLMC configuration, see GP-121158 WID: Downlink Multi Carrier GERAN, 3GPP GERAN#55, Ericsson & ST-Ericsson, a TFI expansion, referred to as extended TFI (eTFI), may be needed to increase the TFI addressing space, when such MS are multiplexed on the same radio resources of a given set of DL carriers. Different approaches for TFI expansion exist for radio blocks carrying user plane payload wherein a Cyclic Redundancy Check (CRC) code may be used solely for radio block error detection, see WO2013070163A1, Methods and devices for providing TFI, Liberg, Sundberg, Schliwa-Bertling and Eriksson. A radio block is understood herein to comprise a radio block header and a payload information field, e.g., control plane payload or user plane payload, supplemented with a number of parity bits used for verifying the validity of the radio block header and payload. In addition, there is an approach that may ensure control plane payload, i.e., Packet Associated Control Channel (PACCH) blocks sent to a MS in a DLMC configuration with an eTFI assignment may not be correctly received by a non-eTFI capable MS and vice versa, see GP-131135—Extended TFI Addressing space for DLMC, 3GPP GERAN#60, Telefon AB LM Ericsson. PACCH blocks are an example of radio blocks. See also GP-130662 DLMC—Extended TFI Addressing Space, 3GPP GERAN#59, Ericsson & ST-Ericsson.

In GERAN, a number of logical channels such as the Packet Associated Control Channel (PACCH) and Slow Associated Control Channel (SACCH), to mention a few, are based on the channel encoding where a shortened FIRE code is used, appending a 40 bit parity bit field to 184 information bits, see 3GPP TS 45.003 v12.0.0, 3GPP; GERAN; Channel Coding.

These 40 parity bits can either be used to correct or detect errors or both detect and correct errors.

FIRE-encoding is one of multiple available radio block encoding techniques, which map a field of information bits to a code word, where the Hamming distance between possible code words facilitates correction and/or detection of errors when decoding the radio blocks.

The approach presented in GP-131135—Extended TFI Addressing space for DLMC, 3GPP GERAN#60, Telefon AB LM Ericsson may provide the desired extension of the TFI space when sending a FIRE-encoded control block, e.g., a PACCH block, to a MS in a DLMC configuration with an assigned eTFI. This may be done using a DL radio resource also being monitored by a non-eTFI capable MS, i.e., a MS not supporting DLMC, or a MS in a DLMC configuration without an assigned eTFI, for the potential arrival of PACCH blocks. That is, the solution in GP-131135—Extended TFI Addressing space for DLMC, 3GPP GERAN#60, Telefon AB LM Ericsson may prevent the non-eTFI capable MS from declaring a PACCH block sent to a MS in DLMC configuration with an assigned eTFI to be valid. The approach described in GP-131135—Extended TFI Addressing space for DLMC, 3GPP GERAN#60, Telefon AB LM Ericsson may also prevent an eTFI capable MS in a DLMC configuration with an assigned eTFI from declaring a PACCH block sent to a non-eTFI capable MS to be valid.

This is because the FIRE code is a class of cyclic block codes used both for burst error correction and error detection. The burst error correction capability of the FIRE code is defined by the length b of the shortest uncorrectable burst error, see Digital Communications (5th edition), Proakis & Salehi, McGraw-Hill International edition.

An existing approach for extending the TFI space for PACCH blocks is captured in GP-131125—Extended TFI Addressing space for DLMC, 3GPP GERAN#60, Telefon AB LM Ericsson, and implemented in 3GPP TS 45.003 v12.0.0, 3GPP; GERAN; Channel Coding and constitutes the XORing of the three bit eTFI value and a three bit fixed pattern, i.e. all 1's, with a subset of the PACCH block parity bits. The fixed pattern of three bits is used to ensure that even eTFI values with low Hamming weight may ensure good false detection performance for legacy MSs decoding the PACCH block that assumes no XORing of bits has been done at the transmitter side. The Hamming weight may be effectively determined by comparing the set of bits comprising the eTFI value assigned to one device to the set of bits comprising the eTFI value assigned to a different device on a per bit position basis, whereby the greater the differences of the assigned eTFI values when considered on a per bit position basis the greater the Hamming weight (Hamming distance). Legacy devices may be considered as having been assigned an eTFI value of all zeros for the purpose of determining the Hamming weight. The "Hamming weight" for a sequence or string, for example, may be the number of symbols that differs from "0". In a typical binary case the "Hamming weight" may be the number of "1's" in the sequence. The method does however not provide the TFI uniqueness, and false detection performance, that may be required when multiplexing eTFI capable DLMC mobiles on a PDCH. To exemplify the problem, FIG. 1 depicts the 40 parity bits generated by the FIRE encoder and a scenario where the methodology described in GP-131125 is used under the assumption that two eTFI capable DLMC devices A and B are multiplexed on a the same PDCH. Device A is assigned eTFI='000' and device B is assigned eTFI='001'. This Figure shows a BTS transmitter send a PACCH block to device A with an assigned eTFI=000. Then, device B with assigned eTFI=001 will perform XORing of the bits in bit positions 0, 19 and 38 with the 1st, 2nd and 3rd bits respectively of the three bit fixed pattern, i.e. all 1's, and the bits in bit positions 1, 20 and 39 with the 1st, 2nd and 3rd bits respectively of its assigned eTFI=001, i.e., it assumes eTFI=001 has been XORed into the transmitted PACCH block, and thereby introduces a single error in bit position 39 of the recovered PACCH block. However, due to the error correction capability associated with the FIRE code, device B will correct this induced error and consider the PACCH block to be valid, and therefore, further consider the TFI field in the header of the PACCH block. If the TFI value in the header matches its assigned TFI value, device B will attempt to act on the information carried in the PACCH block even though it was sent with device A as the intended recipient. This may then lead to unpredictable operation within device B which includes the potential for aborting its corresponding DL TBF, thereby resulting in the failure to deliver the intended user plane payload.

As outlined above, the DLMC feature may require an expansion of the TFI field. However, existing methods for TFI expansion may result in one or more unintended recipients concluding they have received a valid TBF block and other errors leading to an unwanted and unpredictable behavior in DL as well as UL.

SUMMARY

It is an object of embodiments herein to improve the performance in a wireless communications network by improving the way in which encoded radio blocks are sent and received between devices in a wireless communications network.

According to a first aspect of embodiments herein, the object is achieved by a method performed by a first device for sending a modified encoded radio block to a second device. The first device and the second device operate in a wireless communications network. The first device selects a set of bit positions of an encoded radio block. The encoded radio block has the second device as intended recipient. The set of bit positions is unique to a value of an eTFI assigned to the second device, or wherein the set of bit positions is unique to a case in which no eTFI has been assigned to the second device. The first device performs a modulo-2-addition of the selected set of bit positions of the encoded radio block with a pre-determined bit pattern, to obtain a modified encoded radio block. The first device sends the modified encoded radio block to the second device.

According to a second aspect of embodiments herein, the object is achieved by a method performed by the second device. The method is for determining whether the second device is the intended recipient of the modified encoded radio block sent by the first device. The first device and the second device operate in the wireless communications network. The second device receives the modified encoded radio block from the first device. The second device performs a bit-wise modulo-2-addition between the modified encoded radio block and a pre-determined bit pattern, to reverse a modulo-2-addition performed by the first device on the encoded radio block corresponding to the modified encoded radio block. The bit-wise modulo-2-addition is performed in accordance with the eTFI assigned to the second device so that the bit-wise modulo-2-addition is performed between a selected set of bit positions of the modified encoded radio block and the pre-determined pattern. The selected set of bit positions is unique to a value of the eTFI assigned to the second device. The second device determines whether or not the second device is the intended recipient of the modified encoded radio block. The determining comprises decoding the encoded radio block after performing the bit-wise modulo-2-addition.

According to a third aspect of embodiments herein, the object is achieved by the first device. The first device is configured to send a modified encoded radio block to the second device. The first device and the second device are configured to operate in the wireless communications network. The first device is further configured to select the set of bit positions of the encoded radio block. The encoded radio block has the second device as intended recipient. The set of bit positions is unique to the value of the eTFI assigned to the second device, or the set of bit positions is unique to the case in which no eTFI has been assigned to the second device. The first device is further configured to perform the modulo-2-addition of the selected set of bit positions of the encoded radio block with the pre-determined bit pattern, to obtain a modified encoded radio block. The first device is further configured to send the modified encoded radio block to the second device.

According to a fourth aspect of embodiments herein, the object is achieved by the second device. The second device is configured to determine whether the second device is the intended recipient of the modified encoded radio block. The encoded radio block is configured to be sent by the first device. The first device and the second device are configured to operate in the wireless communications network. The second device is further configured to receive the modified encoded radio block from the first device. The second device is further configured to perform the bit-wise modulo-2-addition between the modified encoded radio block and the pre-determined bit pattern, to reverse a modulo-2-addition performed by the first device on the encoded radio block corresponding to the modified encoded radio block. The bit-wise modulo-2-addition is configured to be performed in accordance with the eTFI assigned to the second device. This is so that the bit-wise modulo-2-addition is performed between the selected set of bit positions of the modified encoded radio block and the pre-determined pattern. The selected set of bit positions is unique to the value of the eTFI assigned to the second device. The second device is further configured to determine whether or not the second device is the intended recipient of the modified encoded radio block. To determine comprises decoding the encoded radio block after performing the bit-wise modulo-2-addition.

According to a fifth aspect of embodiments herein, the object is achieved by a computer program, comprising instructions which, when executed on at least one processor, cause the at least one processor to carry out the method performed by the first device.

According to a sixth aspect of embodiments herein, the object is achieved by a carrier containing the computer program to carry out the method performed by the first device, wherein the carrier is a computer program product.

According to a seventh aspect of embodiments herein, the object is achieved by a computer program, comprising instructions which, when executed on at least one processor, cause the at least one processor to carry out the method performed by the second device.

According to an eighth aspect of embodiments herein, the object is achieved by a carrier containing the computer program to carry out the method performed by the second device, wherein the carrier is a computer program product.

By selecting the set of bit positions of the encoded radio block, which are unique the eTFI assigned to the second device, that is, to the intended recipient of the encoded radio block, or by selecting the set of bit positions which is unique to a case in which no eTFI has been assigned to the second device, and then, by performing the modulo-2-addition of the selected set of bit positions with the pre-determined bit pattern, the first device enables the second device to discriminate if the modified encoded radio block sent by the first device has the second device as intended recipient or not. This is in the context of multiple devices monitoring the same resources wherein the modified encoded radio block is being sent by the first device. By enabling the discrimination of radio blocks modified in relation to an eTFI, a backwards compatible extension of the TFI addressing space is provided for devices monitoring the same resources on which the radio blocks are being sent, e.g., in terms of GERAN, which is applicable to radio blocks to which an radio block encoding technique such as the FIRE code, has been applied. This is because the methods disclosed enable the eTFI, which is designed to extend the TFI addressing space, to be uniquely used by the device to which it has been assigned.

BRIEF DESCRIPTION OF THE DRAWINGS

Examples of embodiments herein are described in more detail with reference to the accompanying drawings, in which.

DETAILED DESCRIPTION

As part of the solution according to embodiments herein, a problem will first be identified and discussed.

As stated earlier, the burst error correction capability of the FIRE code may be defined by the length b of the shortest uncorrectable burst error, see Digital Communications (5th edition), Proakis & Salehi, McGraw-Hill International edition. This implies that if the approach described above in GP-131135—Extended TFI Addressing space for DLMC, 3GPP GERAN#60, Telefon AB LM Ericsson would be applied on a FIRE-encoded PACCH block, without any modification, multiple MS in a DLMC configuration, with an assigned eTFI, would: a) XOR fixed bit positions in the received FIRE-encoded PACCH block with the same 3 bit beacon bit pattern, which may be all 1's, and then; b) XOR additional fixed bit positions in the received FIRE-encoded PACCH block with the bits corresponding to their respective assigned eTFI values. XOR refers to a logical operation that outputs true whenever both inputs differ, one is true, the other is false. XORing refers to the act of performing a XOR operation, and may be also referred to herein as performing a modulo-2-addition. A beacon bit pattern, also referred to herein as a pre-determined bit pattern, may be understood as a sequence of N bits comprising the beacon bit pattern wherein the value of N as well as each bit in pattern has a pre-determined value.

Actions a) and b) described above may result in these MS all effectively reversing the beacon bit pattern XORing performed by the BSS since they all use the same beacon bit pattern, 3 bits long and all 1's, and XOR it using the same bits of a FIRE-encoded PACCH block. However, these MS may also perform the eTFI related XORing procedure whereby the unintended recipients of the PACCH block may introduce one or more bit errors, depending on the number of 1's in their assigned eTFI value.

The unintended recipients may then apply the error correction feature of the FIRE code which may result in one or more of them successfully correcting the introduced bit errors, in which case they may conclude they have received a valid PACCH block. These unintended recipients may then erroneously act on the PACCH block if the value of the TFI field in the PACCH block header happens to match their assigned TFI. The desired PACCH block segregation between multiple MS in a DLMC configuration with an assigned eTFI may then be broken and an extension of the TFI field may no longer be feasible.

Figure 1:
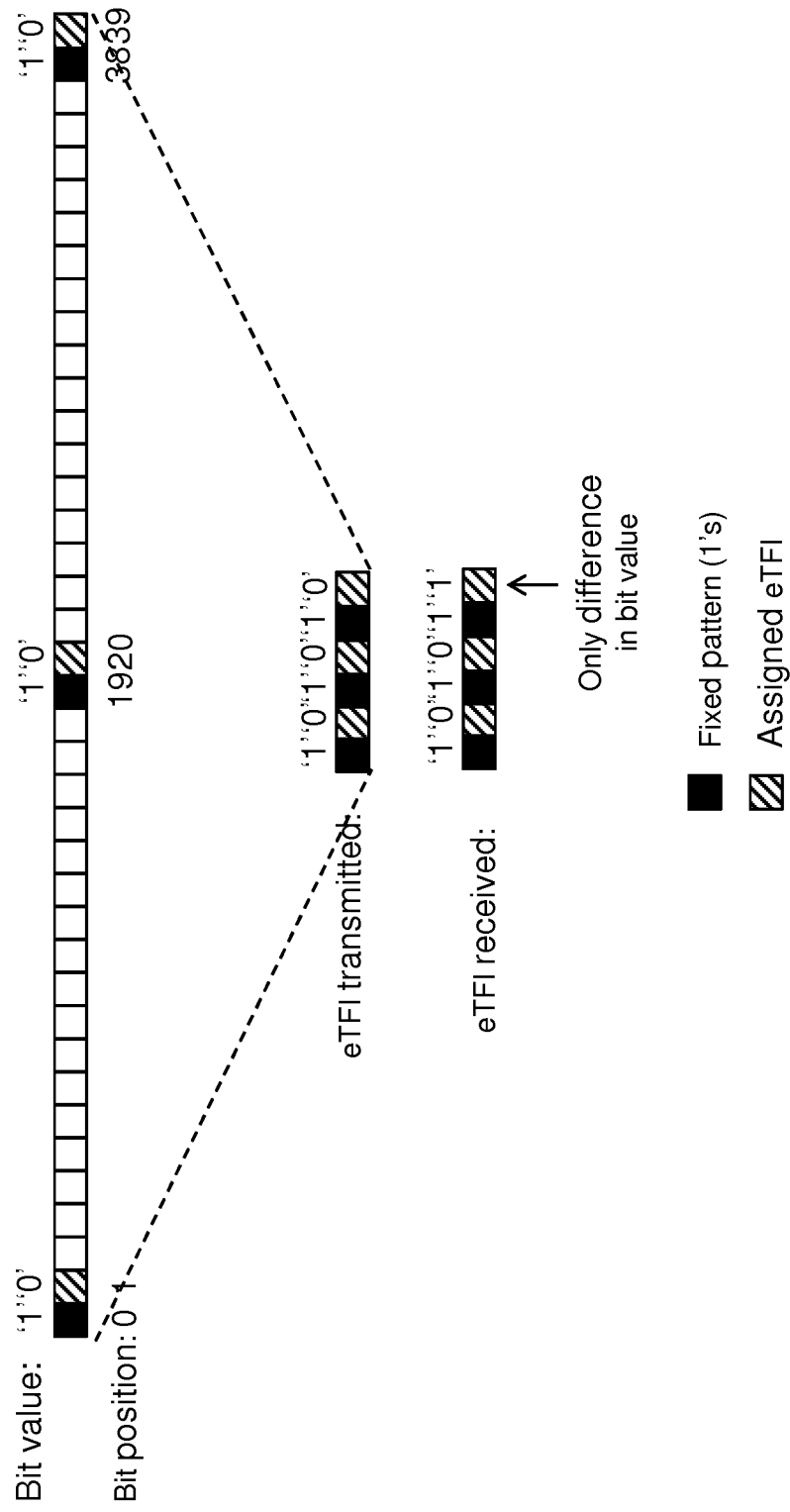
FIG. 1 is a schematic diagram illustrating an existing approach for extending the TFI space for PACCH blocks.
Figure 2:
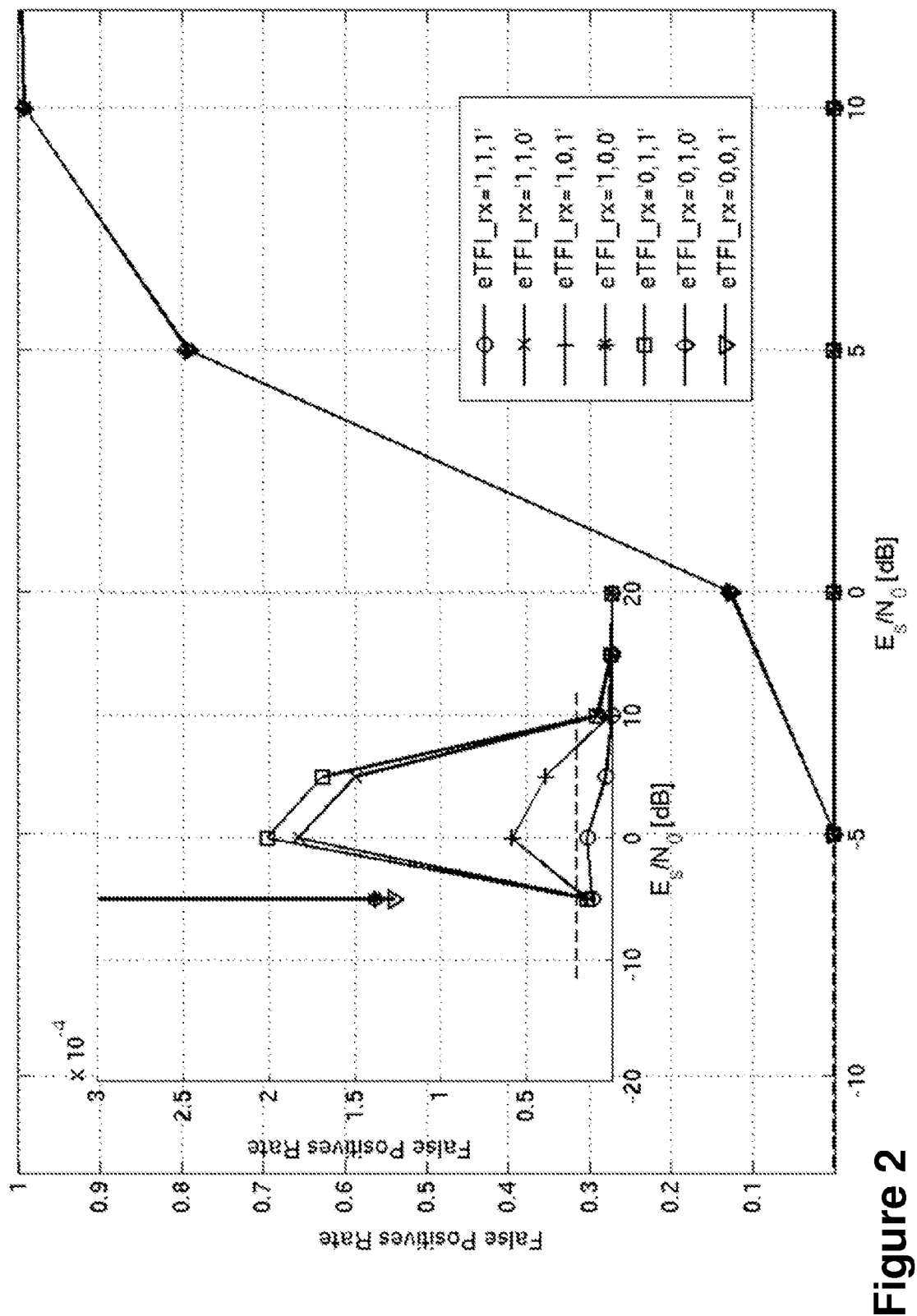
FIG. 2 is a graphical representation of False Positives Rate resulting from eTFI related XORing.

The problem is shown in FIG. 2. FIG. 2 discloses the False Positives Rate resulting from eTFI related XORing for different radio conditions, which are represented as Signal to Noise Ratio (SNR) (or $E_s/N_0$) regions. The 40 parity bits appended in the FIRE code may be used to correct and/or detect errors leading to a delicate tradeoff between improved Block Error Rate (BLER) and False Positives Rate or False Detection Rate (FDR). FDR is referring to a receiver's ability to detect if a received block was erroneous or not. A "false" positive occurs when the block received is incorrect and after attempted error correction is still incorrect but is detected as correctly received by the receiver.

In the case of a GERAN receiver, this balance may ultimately be determined by a requirement stating that when exposed to a random input signal "the overall reception performance shall be such that no more than 0.002% of the frames are assessed to be error free", see 3GPP TS 45.005, 3GPP; GERAN; Radio Transmission and reception.

In FIG. 2, the same fixed beacon pattern, also referred to herein as the fixed bit pattern, has been assumed for all MSs and only the eTFI values between the MSs are varying. The transmitter is using eTFI=000. It may be seen that it is only the eTFI=111 that fulfills the specification requirement on $2e^{-5}$ $2\times10^{-5}$ false positives rate. This is because three errors will be introduced by the XORing operation when a MS is assigned an eTFI=111, considering Tx uses eTFI=000 and Rx uses eTFI=111. In addition, eTFI values with two bit values differing, eTFI=101, 011, 110, show a higher false positive rate for some SNR (or $E_s/N_0$) regions, while at good radio condition, e.g., high SNR, the requirements are easily fulfilled. For all eTFI values where only one bit is differing, compared to the eTFI=0 '000' bit pattern, an unsuitable false positives performance is seen, reaching 100% at good radio conditions.

Figure 3:
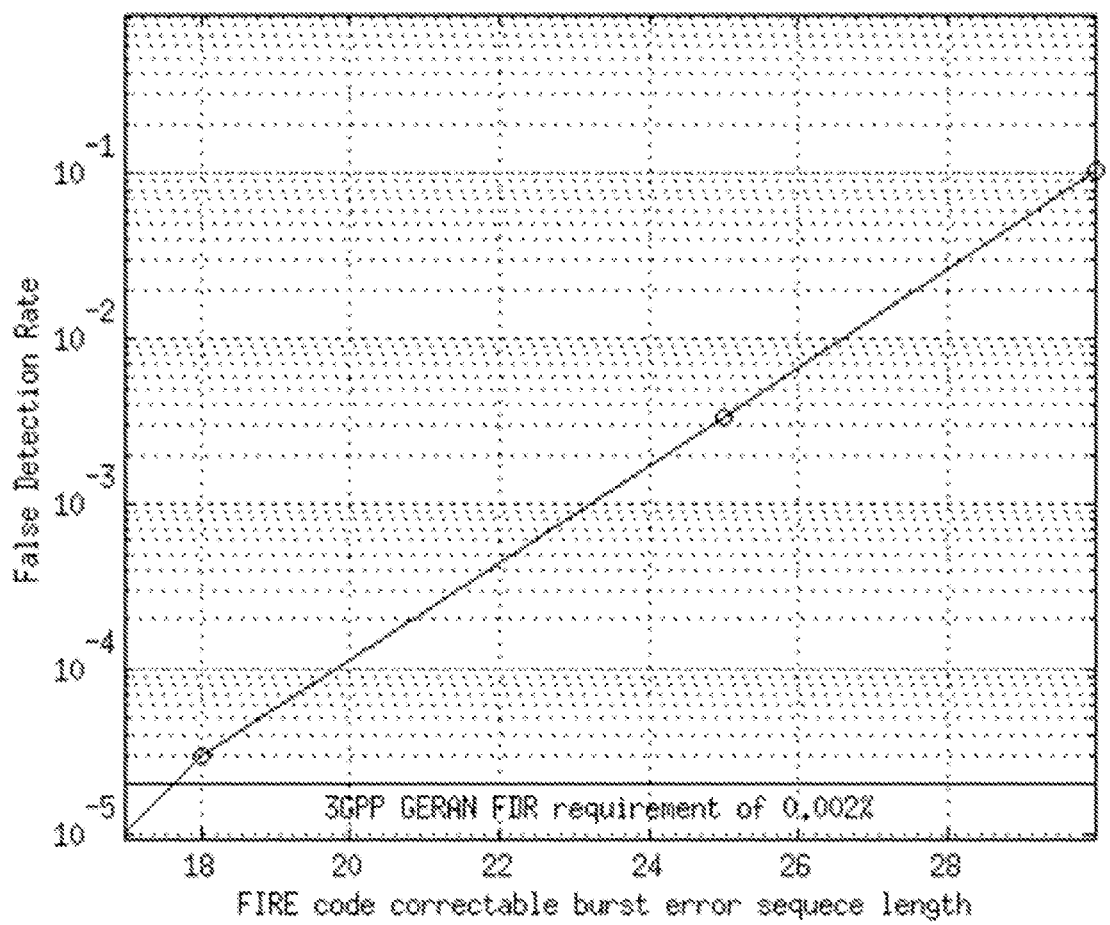
FIG. 3 is a graphical representation of False Detection Rate of a GSM receiver as a function of configured FIRE code correctable burst error sequence lengths when exposed to random input.

Based on the requirement in GERAN that when exposed to a random input signal "the overall reception performance shall be such that no more than 0.002% of the frames are assessed to be error free", it may be shown in theory that a GERAN receiver is typically not allowed to be configured for correction of burst error sequences of greater length than 17 bits, see Användning av Fire-kod för felrättning och felupptäckt i GSM, Eva-Karin Andersson, Departement of Information Theory, Lunds University. This is also confirmed in FIG. 3 where FDR is plotted as a function of correctable burst error sequence lengths. FIG. 3 discloses False Detection Rate of a GSM receiver as a function of configured FIRE code correctable burst error sequence lengths when exposed to random input. When the FIRE decoder is configured to correct error bursts of length 18, or above, the GERAN FDR requirement of 0.002% is violated.

The current approach for extending the eTFI for PACCH blocks, e.g., the approach in TS45.003 v12.0.0 for PACCH control blocks, is not sufficient if the eTFI values assigned to different MS have a small Hamming distance, since the FIRE code may be used to correct the difference in bit states. In information theory, the Hamming distance between two bit strings of equal length is the number of bit positions at which the corresponding values are different. In other words, the Hamming distance measures the minimum number of substitutions required to change one bit string to be the same as the other.

Thus, based on the current DLMC specifications, MS in a DLMC configuration with eTFI assignments may receive a PACCH block, wherein each MS may conclude that it is the intended recipient of the same PACCH block. For example, the case may be considered where a first MS, referred to herein as MS1, and a second MS, referred to herein as MS2, are both in a DLMC configuration may be considered, wherein MS1 is assigned eTFI=001, MS2 is assigned eTFI=011 and a DL PACCH block is sent on a PDCH resource monitored by both MS1 and MS2, with MS1 being the intended recipient. This example further assumes ideal or good radio conditions in the sense that no additional errors are introduced over the air interface:

a) The Base Station Subsystem (BSS) creates a PACCH block, wherein parity bits 1, 20 and 39 of the PACCH block are XORed with the 3 bit beacon bit pattern, all 1's, and parity bits 0, 19 and 38 are XORed with the eTFI of MS1, i.e. parity bit 0 is XORed with 0, parity bit 19 is XORed with 0 and parity bit 38 is XORed with 1.

b) The BSS sends the XORed PACCH block which is received by both MS1 and MS2. MS2 XORs each of the received parity bits 1, 20 and 39 with the 3 bit beacon pattern, all 1's, to effectively reverse the beacon bit XORing performed by the BSS. This procedure is according to 3GPP TS 45.003 v12, 3GPP; GERAN; Channel Coding.

c) MS2 then XORs received parity bits 0, 19 and 38 with its assigned eTFI=011, i.e., parity bit 0 is XORed with 0, parity bit 19 is XORed with 1 and parity bit 38 is XORed with 1, to effectively reverse the eTFI XORing performed by the BSS, except for parity bit 19, which MS2 has inverted, since the eTFI of MS1 and MS2 differs only in the second bit position; eTFI MS1=001, eTFI MS2=011.

d) As such, MS2 now has a parity field wherein only the value of the parity bit in bit position 19 differs from the value of parity bit in bit position 19 originally sent by the BSS. However, MS2 then applies the error correction feature of the FIRE code, corrects what it thinks is an error, introduced by the radio interface, in bit position 19 of the parity field and therefore concludes that is has received a valid PACCH block for which it may be the intended recipient.

e) MS2 then looks at the TFI field of the PACCH block header and if it matches its assigned TFI, i.e., which may happen for the case where MS2 has been assigned the same TFI value as MS1, it will consider itself the intended recipient of the PACCH block.

f) Since MS1 is the actual intended recipient, it performs XORing that precisely reverses the XORing performed by the BSS, and therefore also concludes that it is the intended recipient of the same PACCH block.

Terminologies

The following commonly terminologies are used in the embodiments and are elaborated below:

Radio network node: In some embodiments the non-limiting term radio network node is more commonly used and it refers to any type of network node serving MS and/or connected to other network node or network element or any radio node from where MS receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, RRU, RRH, nodes in distributed antenna system (DAS) etc.

Network node: In some embodiments a more general term "network node" is used and it can correspond to any type of radio network node or any network node, which communicates with at least a radio network node. Examples of network node are any radio network node stated above, core network node (e.g. MSC, MME etc), O&M, OSS, SON, positioning node (e.g. E-SMLC), MDT etc.

User equipment: In some embodiments the non-limiting term user equipment (UE) is used and it refers to any type of wireless device communicating with a radio network node in a cellular or mobile communication system. Examples of UE are target device, device to device UE, machine type UE or UE capable of machine to machine communication, PDA, iPAD, Tablet, mobile terminals, smart phone, laptop embedded equipped (LEE), laptop mounted equipment (LME), USB dongles etc.

Mobile station: In some embodiments the non-limiting term Mobile Station (MS) is used and it refers to any type of wireless device communicating with a radio network node in a cellular or mobile communication system. Examples of MSs are target device, device to device MS, machine type MS or MS capable of machine to machine communication, PDA, iPAD, Tablet, mobile terminals, smart phone, laptop embedded equipped (LEE), laptop mounted equipment (LME), USB dongles etc.

Embodiments herein may also apply to the multi-point carrier aggregation systems.

Note that although terminology from 3GPP GERAN has been used in this disclosure to exemplify the embodiments herein, this should not be seen as limiting the scope of the embodiments herein to only the aforementioned system. Other wireless systems, including WCDMA, WiMax, UMB and LTE, may also benefit from exploiting the ideas covered within this disclosure.

Also note that terminology such as eNodeB and MS should be considering non-limiting and does in particular not imply a certain hierarchical relation between the two; in general "eNodeB" could be considered as device 1 and "MS" device 2, and these two devices communicate with each other over some radio channel. Herein, we also focus on wireless transmissions in the downlink, but the embodiments herein may also be applicable in the uplink.

Embodiments herein may be used to ensure that a FIRE-encoded PACCH block, as an example of encoded radio block, sent on radio resources shared by multiple MS in a DLMC configuration, with eTFI assignments, may only be acted on by the intended recipient of that PACCH block. In particular, embodiments herein may relate to MS discrimination of PACCH blocks in a DLMC configuration. However, it should be noted that embodiments herein are not limited to GERAN. They are applicable to all types of error correcting codes with pre-determined capabilities such as the FIRE-code with the error correcting capability, and therefore, to all types of encoded radio blocks.

Embodiments herein may consider the case where a FIRE-encoded PACCH block is addressed to a target MS in a DLMC configuration with an assigned eTFI wherein other MS, either with or without an assigned eTFI, are monitoring the same DL radio resources for the potential reception of a PACCH block addressed to them. Embodiments herein may also apply to the case of a FIRE-encoded PACCH block addressed to a target MS without an assigned eTFI wherein other MS with an assigned an eTFI are monitoring the same DL radio resources for the potential reception of a PACCH block addressed to them.

In this section, the embodiments herein will be illustrated in more detail by a number of exemplary embodiments. Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should be noted that these embodiments are not mutually exclusive. Components from one embodiment may be tacitly assumed to be present in another embodiment and it will be obvious to a person skilled in the art how those components may be used in the other exemplary embodiments.

Note that although terminology from Global System for Mobile communications (GSM) has been used in this disclosure to exemplify the embodiments herein, this should not be seen as limiting the scope of the embodiments herein to only the aforementioned system. Other wireless systems, including Wideband Code Division Multiple Access (WCDMA), Worldwide Interoperability for Microwave Access (WiMax), UMB and LTE, may also benefit from exploiting the ideas covered within this disclosure. Thus, also note that terminology such as BSS and MS should be considering non-limiting.

Figure 4:
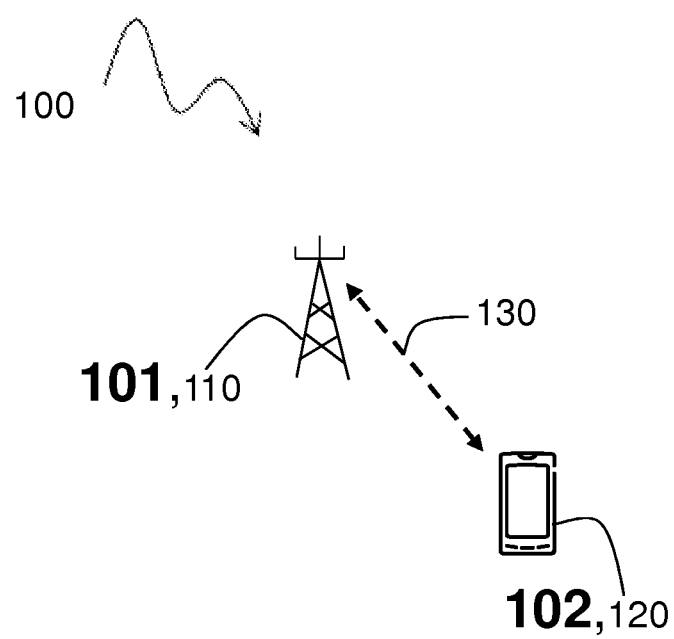
FIG. 4 is a schematic diagram illustrating embodiments in a wireless communications network, according to some embodiments.

FIG. 4 depicts an example of a wireless communications network in which embodiments herein may be implemented. The wireless communications network 100 is a wireless communication network such as an LTE, WCDMA, GSM network, any 3GPP cellular network, Wimax, or any cellular network or system.

The wireless communications network 100 comprises a plurality of devices, such as a first device 101 and a second device 102. Each of the first device 101 and the second device 102 may be a network node, such as the network node 110 described below, or a wireless device, such as the wireless device 120 described below. In the particular example illustrated in FIG. 4, the first device 101 is the network node 110, and the second device 102 is the wireless device 120, but this is a non-limiting example. As stated earlier, the examples herein focus on wireless transmissions in the DL, but the embodiments herein may also be applicable in the UL.

The wireless communications network 100 comprises a plurality of network nodes whereof in this particular example one, the network node 110 is depicted in FIG. 4. The network node 110 may be a transmission point such as a radio base station, for example a BTS, an eNB, an eNodeB, or a Home Node B, and Home eNode B or any other network node capable to serve a user equipment or a machine type communication device in a wireless communications network.

The second device 102 in the particular example of FIG. 4 is a wireless device 120 also referred to as a user equipment, UE, mobile station, or MS which is located in the wireless communication network 100. The wireless device 120, which may e.g. be a user equipment, a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term user equipment used in this document also covers other wireless devices such as Machine to machine (M2M) devices, even though they do not have any user. In some particular embodiments, the second device 102 may be a DLMC capable MS.

The first device 101 may communicate with the second device 102 over a radio link 130, which may be a radio link 130.

Figure 5:
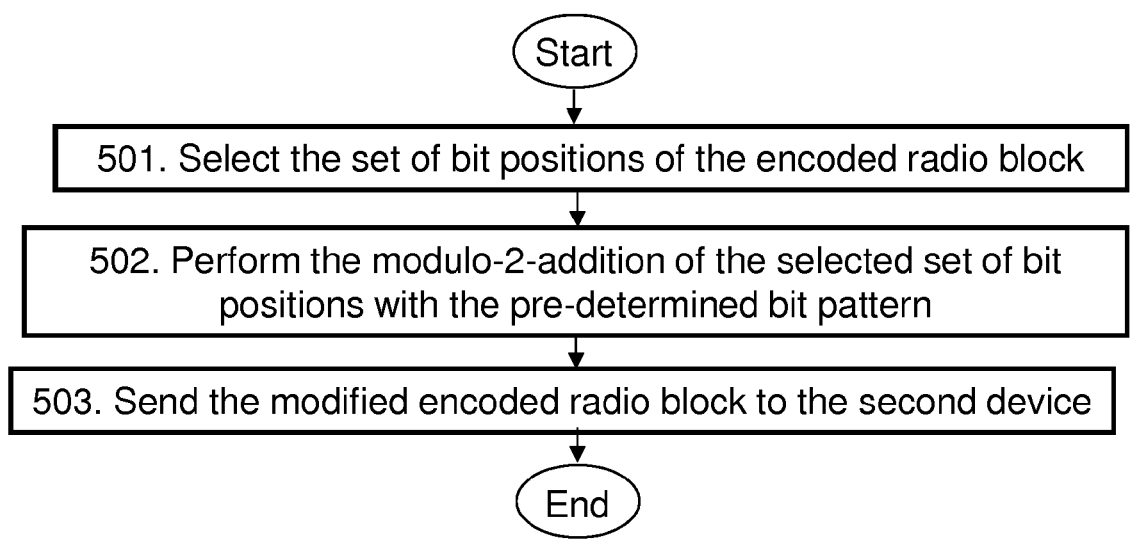
FIG. 5 is a schematic diagram illustrating embodiments of a method in a first device, according to some embodiments.

Embodiments of a method performed by the first device 101 for sending a modified encoded radio block, as described below, to the second device 102, will now be described with reference to the flowchart depicted depicted in FIG. 5. The first device 101 and the second device 102 operate in the wireless communications network 100. FIG. 4 depicts a flowchart of the actions that are or may be performed by the first device 101 in embodiments herein.

Action 501

In order to allow multiple devices in the wireless communications network 100, such as the second device 102, monitoring a packet data resource, to discriminate encoded radio blocks sent on such resource, that is to correctly conclude if they are the intended recipient of the radio blocks, the first device 101 may need to signal some information in the sent radio blocks that may only be correctly decoded by the intended recipient.

For this purpose, the first device 101 selects a set of bit positions of an encoded radio block, that is, the encoded radio block that the first device 101 will send to the second device 102. An encoded radio block refers herein to a radio block to which an error correcting code has been applied, e.g., appended. In some embodiments, the encoded radio block may be a PACCH block that has been encoded with an error correcting code. A FIRE-encoded PACCH block may be used herein as an example for illustrative purposes, but this should not be construed as being limiting.

The encoded radio block has the second device 102 as intended recipient. The set of bit positions is unique to a value of an eTFI, assigned to the second device 102, or the set of bit positions is unique to a case in which no eTFI has been assigned to the second device 102.

That the set of bit positions is unique to a value of an eTFI assigned to the second device 102 may be understood as that the eTFI assigned to the second device 102 determines the set of bit positions in the encoded radio block that the first device will select, for later performing a modulo-2-addition, or XORing, as described below in Action 502. That is, unique sets of bit positions may be used for each eTFI value.

That the set of bit positions is unique to a case in which no eTFI has been assigned to the second device 102 may be understood as that a unique set of bit positions may also be defined for mobiles not assigned an eTFI, which effectively may mean that $2^{N+1}$ unique bit patterns may be defined. This may ensure that the TFI space for DLMC capable MS not supporting the eTFI feature, and MS not supporting DLMC may make use of a different TFI space, effectively doubling the TFI space if no eTFI values are assigned. But on the other hand, it may have more impact on the implementation, since the XORing functionality may need to be implemented also by DLMC capable MS not supporting the eTFI feature.

Action 502

As part of the signaling procedure described herein, and in order to improve data reliability of the encoded radio block by introducing parity information, that is redundancy, into the data sequence of the encoded radio block prior to transmission, in this action, the first device 101 performs a modulo-2-addition, that is, XORing, of the selected set of bit positions of the encoded radio block with a pre-determined bit pattern, to obtain a modified encoded radio block. The selected set of bit positions of the encoded radio block corresponds to the set as selected in Action 501. As mentioned earlier, the pre-determined bit pattern is exemplified by a set of beacon bits where each bit in the set has a pre-determined value. This pre-determined bit pattern may also be referred to as a beacon, beacon bits or beacon bit pattern.

eTFI Specific XORing of the Beacon Bit Pattern (BBP)

In the case of GERAN, and using a FIRE-encoded PACCH block as an illustrative example, it may be sufficient for the transmitter, that is, for the first device 101, to XOR an "N" bit beacon bit pattern, e.g., all 1's, with a subset of bits in the FIRE-encoded PACCH block, that is, with the selected set of bit positions, where at least two of the beacon bits are XORed with their corresponding bit positions in a FIRE-encoded PACCH block, that is, each bit of the beacon bit pattern may be uniquely associated with one bit in a FIRE-encoded PACCH block, that are separated by at least 18 bits to ensure that:

a) All non-eTFI capable MS may not be able to successfully decode the FIRE-encoded PACCH block since they may not be able to correct the errors introduced by the transmitter XORing the beacon bit pattern with an eTFI specific subset of the FIRE-encoded PACCH block bits).

b) All e-TFI capable MS in a DLMC configuration, with an assigned eTFI, that are not the intended recipient of the PACCH block may not be able to successfully decode the FIRE-encoded PACCH block since they may not be able to correct the errors introduced by the transmitter XORing the beacon bit pattern with an eTFI specific subset of the FIRE-encoded PACCH block bits that is different from the subset of the FIRE-encoded PACCH block bits corresponding to the eTFI of the intended recipient.

A non-eTFI capable MS receiving such a PACCH block may effectively fail to correct the errors introduced by the transmitter XORing the FIRE-encoded PACCH block with the "N" bit beacon bit pattern, i.e. only one of the XOR'ed 1's can be corrected by the FIRE code.

In addition, to ensure that a MS in a DLMC configuration with an assigned eTFI may always uniquely determine when it is the intended recipient of a PACCH block sent on PDCH resources monitored by other MS in a DLMC configuration with an assigned eTFI, $2^N$, where N is the number of eTFI bits, unique cases of XORing the all 1's beacon bit pattern with unique subsets of the FIRE-encoded PACCH block bits may be required.

For the case of 3 eTFI bits used, 8 unique applications of the all 1's beacon bit pattern may be required, wherein each is specific to one of the 8 possible eTFI values assigned to a MS in a DLMC configuration, i.e., the beacon bit pattern XORing operation performed by the transmitter for a given target MS may make use of a unique subset of the FIRE-encoded PACCH block bits that corresponds to the eTFI value assigned to that target MS.

XORing of the BBP

As part of the development of embodiments herein, three different beacon bit pattern lengths have been XORed with various parity bit positions of a FIRE-encoded PACCH block, as shown in Table 1.

TABLE 1

XORing depending on the number of bits used for Beacon Bit Pattern.

| Number of bits | XORed parity bit positions |
| --- | --- |
| 2 | [0, 32] + BBP |
| 3 | [0, 16, 32] + BBP |
| 4 | [0, 10, 20, 32] + BBP |

Performance Evaluation

Simulations have been carried out in different scenarios to ensure that the performance of both legacy MSs and new MSs supporting eTFI may not be degraded when applying the XORing operation. The different cases are shown in Table 2.

TABLE 2

Scenarios for BBP evaluation.

| Scenario | Description |
| --- | --- |
| 1 | Legacy MSs receiving a legacy PACCH block (reference) |
| 2 | Legacy MSs receiving a PACCH block with BBP XORing (Tx, No Rx: I.e. BBP applied at Tx side but not at Rx) |
| 3 | New MS assigned an eTFI receiving a legacy PACCH block (No Tx, Rx) |
| 4 | New MS assigned an eTFI receiving a PACCH block with BBP XORing specific to its eTFI (Tx, Rx, same BBP) |
| 5 | New MS assigned an eTFI receiving a PACCH block with BBP XORing specific to an eTFI different from its own (Tx, Rx, different BBP) |

FIGS. 6-10 are graphical representations of the results of these simulations, as described below. In each of these figures, the False Positives Rate is represented as a function different radio conditions, which are represented as SNR) (or $E_s/N_0$ regions. The results are first presented, and then discussed in the section below entitled "Evaluation Results".

Scenario 1, Reference.

Figure 6:
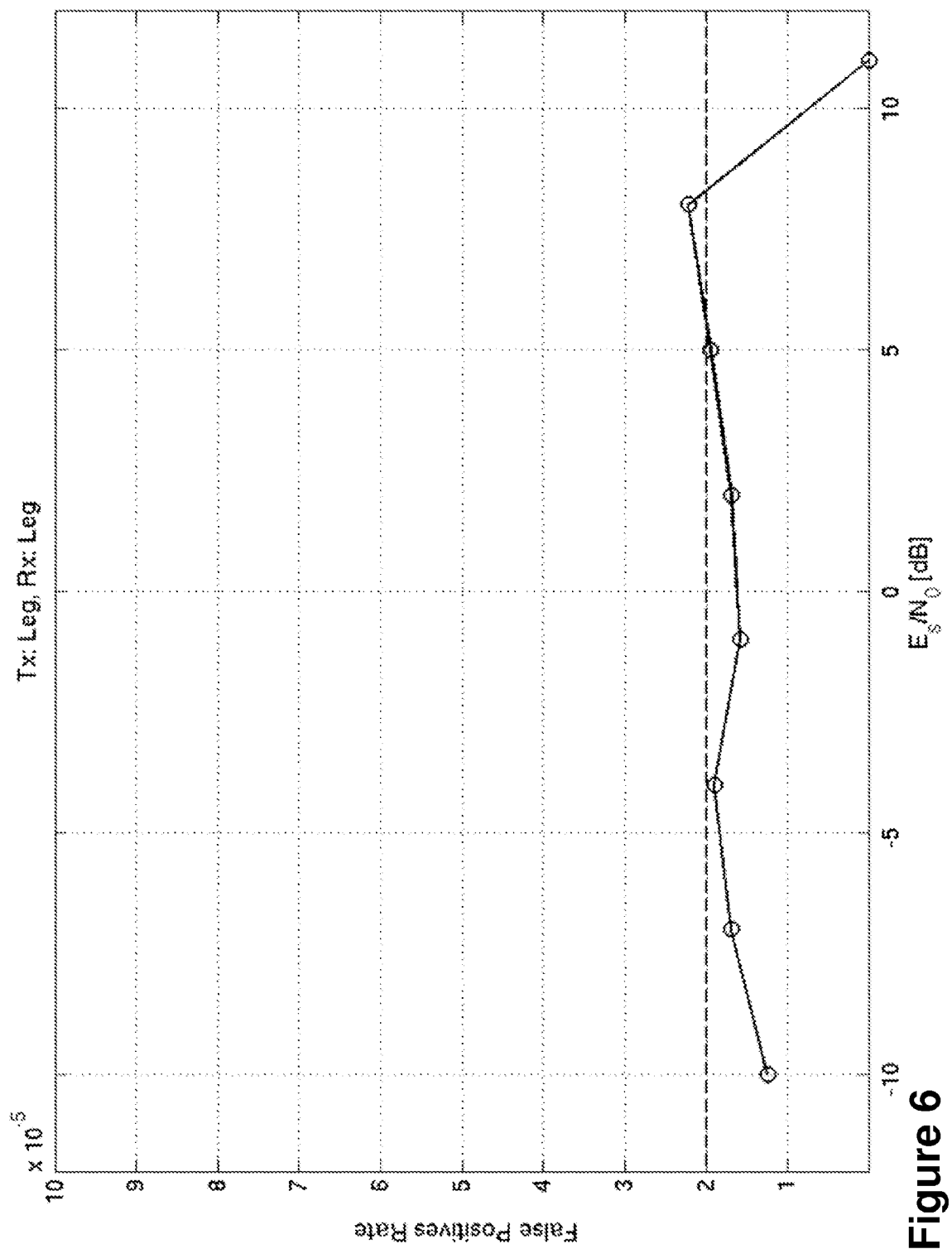
FIG. 6 is a graphical representation of the results of the simulations according to according to some embodiments.

FIG. 6 is a graphical representation of the results of the simulations according to scenario 1, in which a legacy MS receives a legacy PACCH block. That is, FIG. 6 corresponds to a scenario of a Legacy non eTFI capable MSs receiving a legacy PACCH block, not encoded with an eTFI. This may be considered a reference case showing required compliance with the GERAN false positive requirement, see GP-140343.

Scenario 2, Tx, no Rx

Figure 7A:
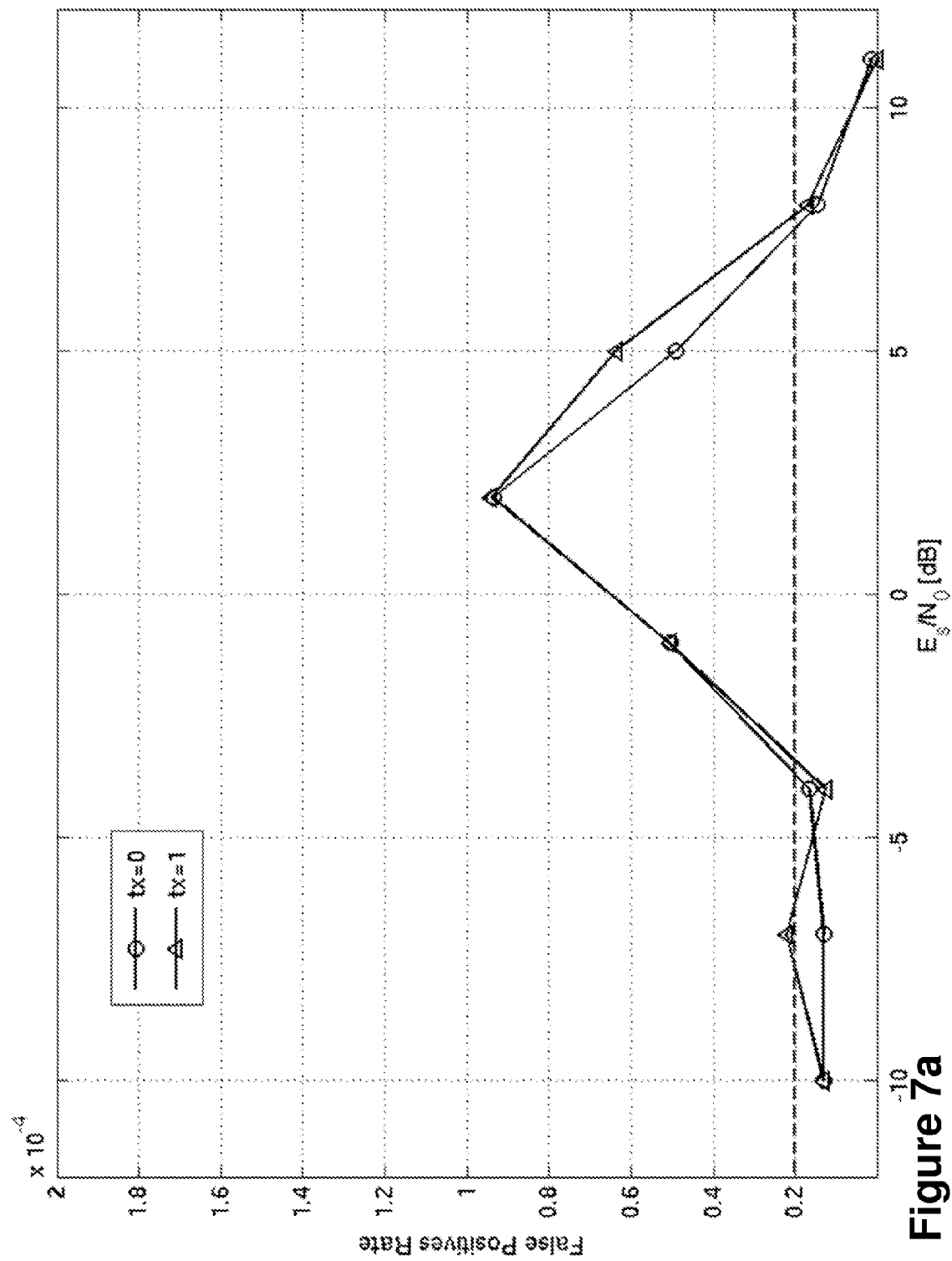
FIGS. 7a, 7b, and 7c are each a graphical representation of the results of the simulations according to according to some embodiments.
Figure 7:
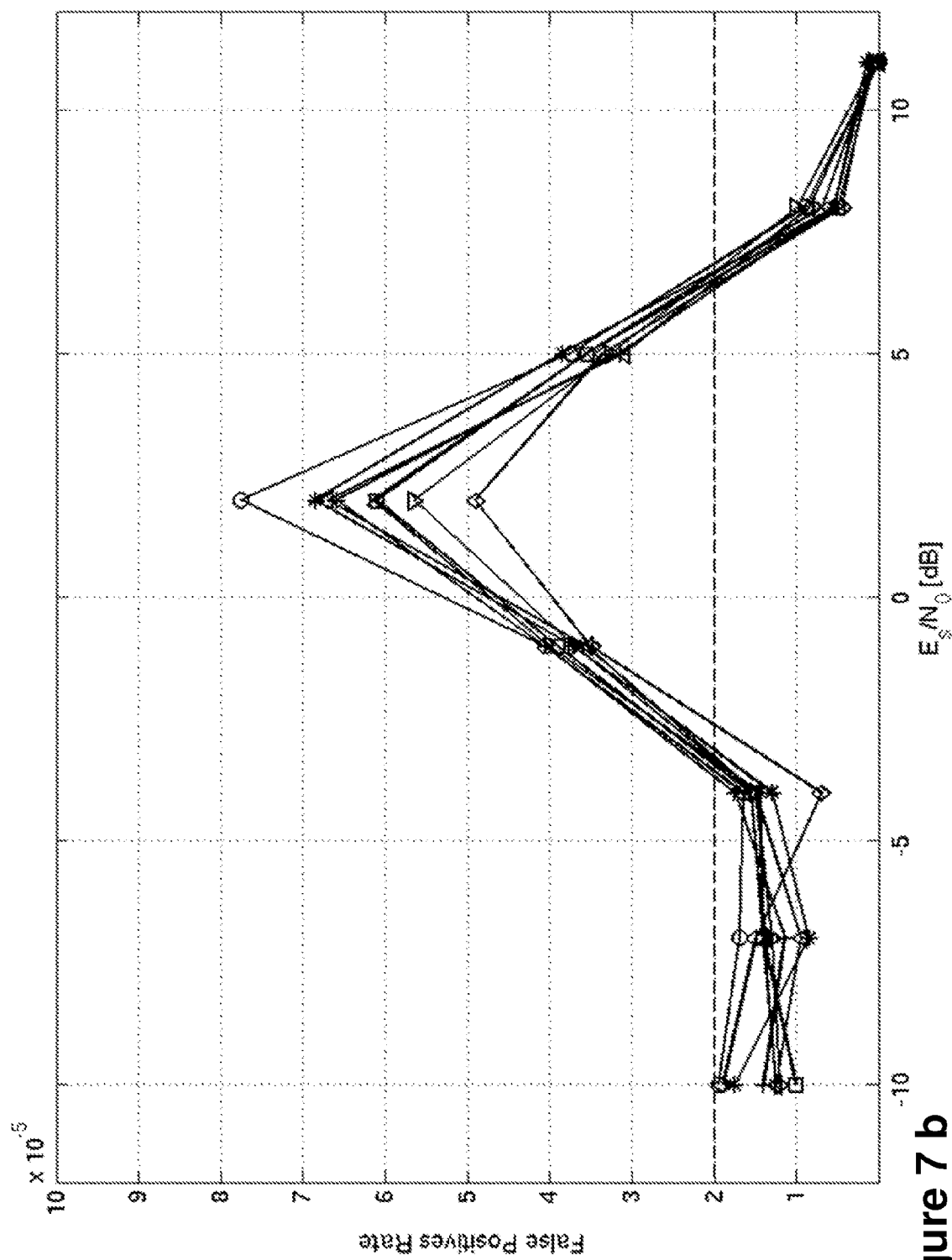
Figure 7C:
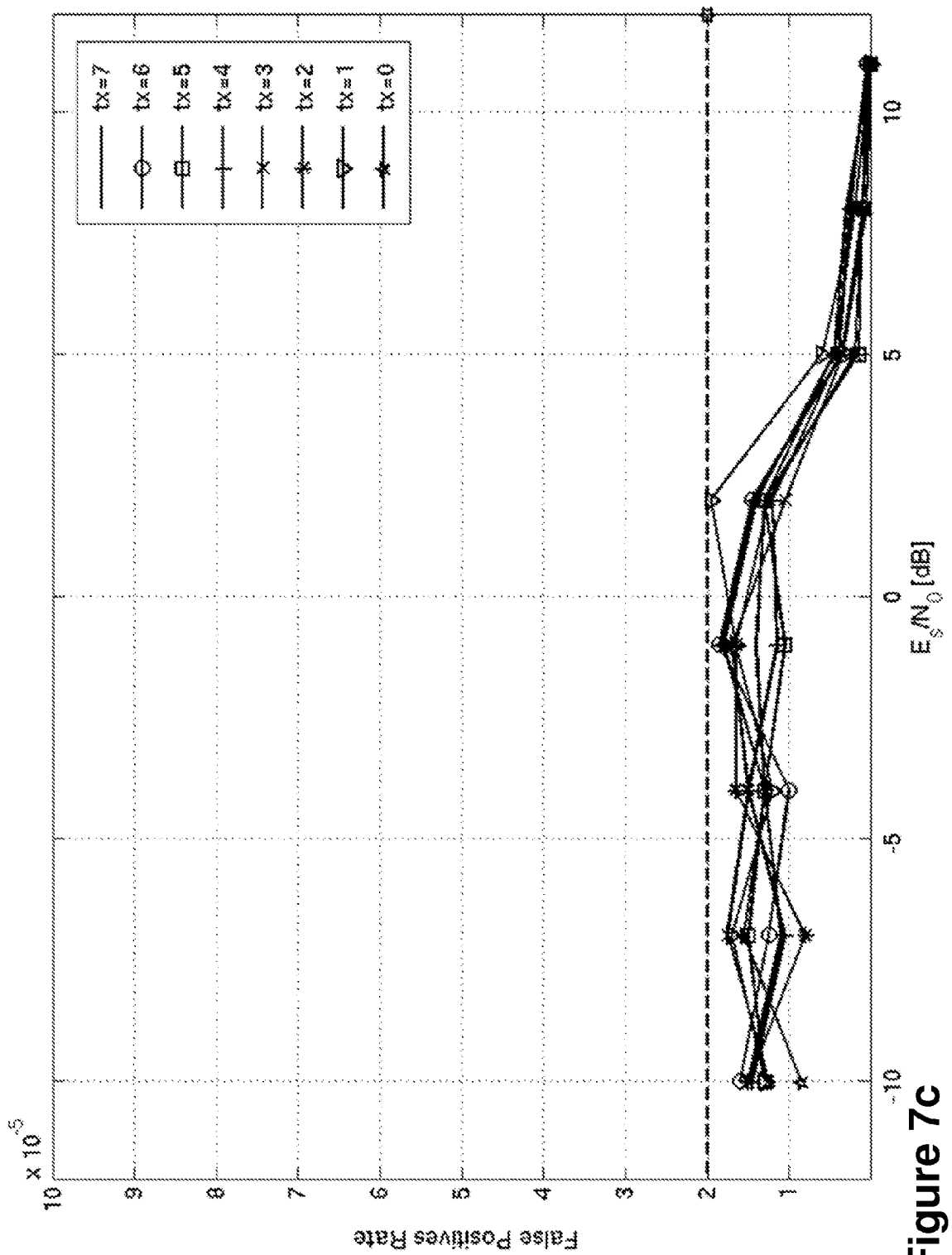

FIGS. 7a, b and c are each a graphical representation of the results of the simulations according to Scenario 2, with 2 bit pattern, FIG. 7a, 3 bit pattern, FIG. 7b, and 4 bit pattern, FIG. 7c. That is, FIGS. 7a, 7b, and 7c are each a graphical representation of simulated results when a legacy non eTFI capable MS receives radio blocks addressed to an eTFI capable MS assigned an eTFI represented by a 2, 3 or 4 bit pattern. The legend of FIG. 7c applies also to FIG. 7b. It may be concluded that a 4 bit eTFI pattern may be required for the legacy MS to fulfill the GERAN false positive rate in this scenario.

Scenario 3, no Tx, Rx

Figure 8:
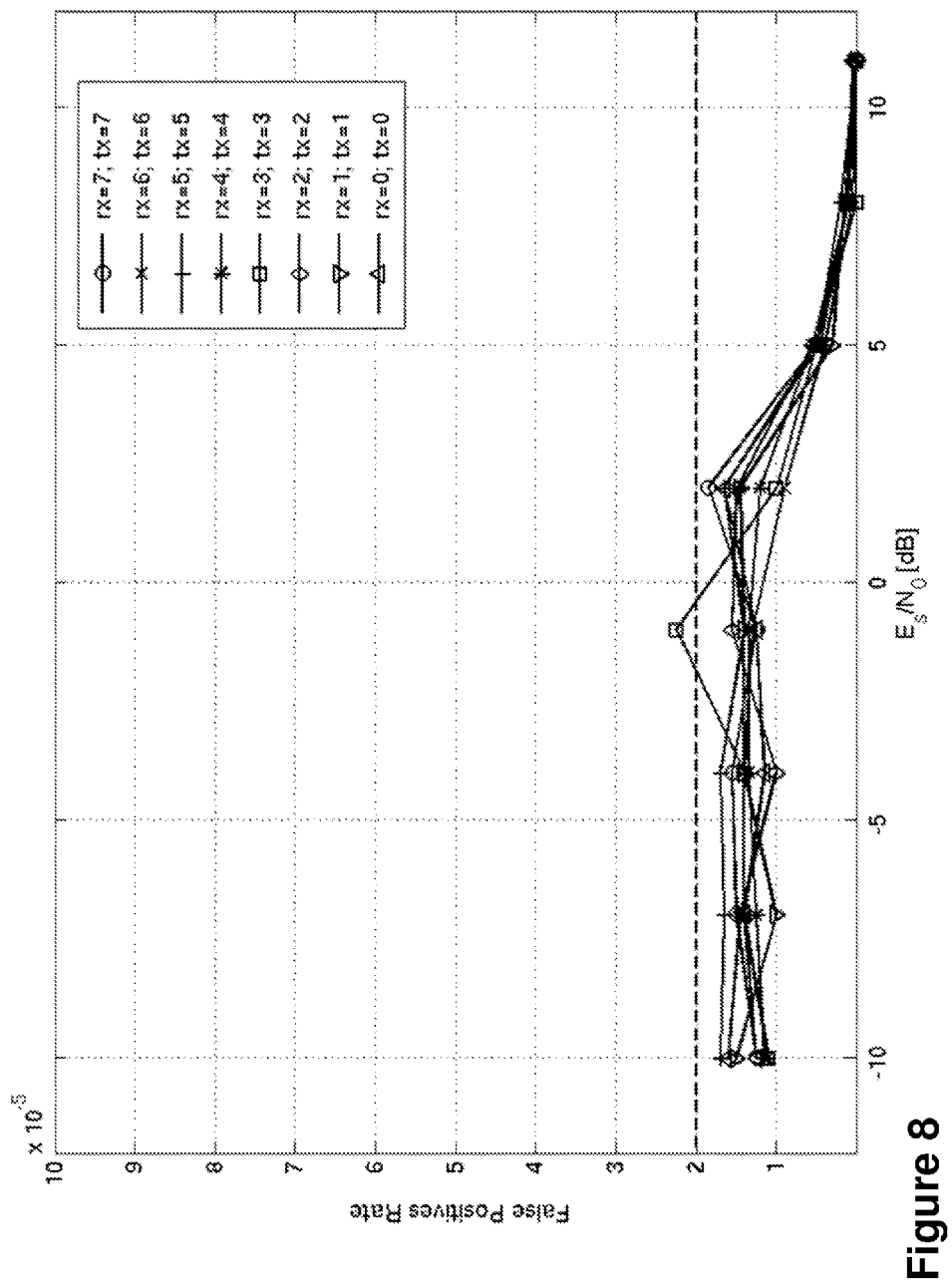
FIG. 8 is a graphical representation of the results of the simulations according to according to some embodiments.

FIG. 8 is a graphical representation of the results of the simulations according to scenario 3, with a 4 bit beacon bit pattern. That is, FIG. 8 is a graphical representation of the results when a new eTFI capable MS assigned an eTFI receives a legacy PACCH block, not intended for the eTFI capable MS. The GERAN false positive rate requirement is met.

Scenario 4, Tx, Rx, Same eTFI

Figure 9:
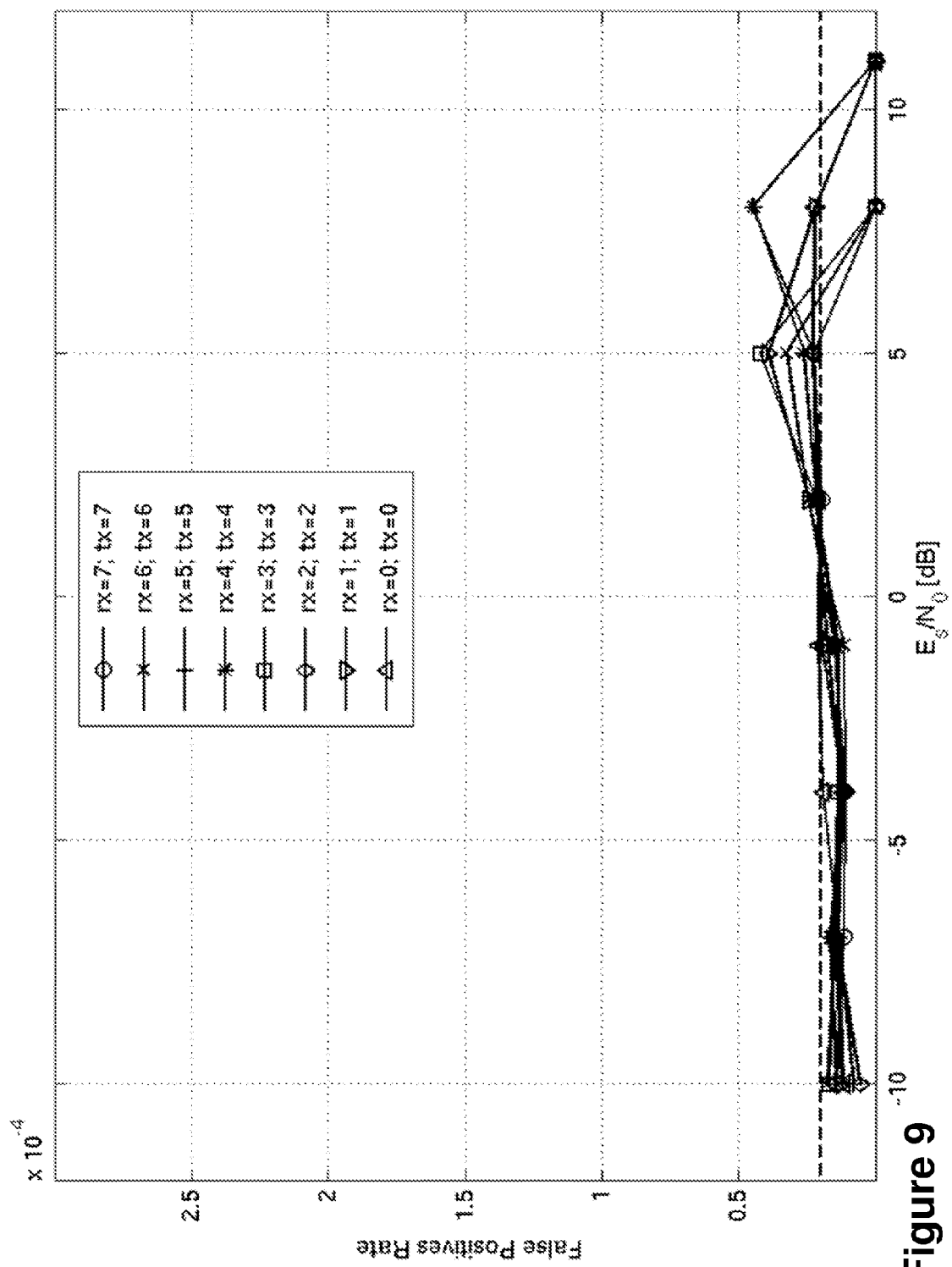
FIG. 9 is a graphical representation of the results of the simulations according to according to some embodiments.

FIG. 9 is a graphical representation of the results of the simulations according to scenario 4, with a 4 bit beacon bit pattern. That is, FIG. 9 is a graphical representation of the results obtained when a new eTFI capable MS assigned an eTFI pattern receives a PACCH block intended for the MS, i.e. with its own eTFI. The GERAN false positive rate requirement is met.

Scenario 5, Tx, Rx, Different eTFI

Figure 10:
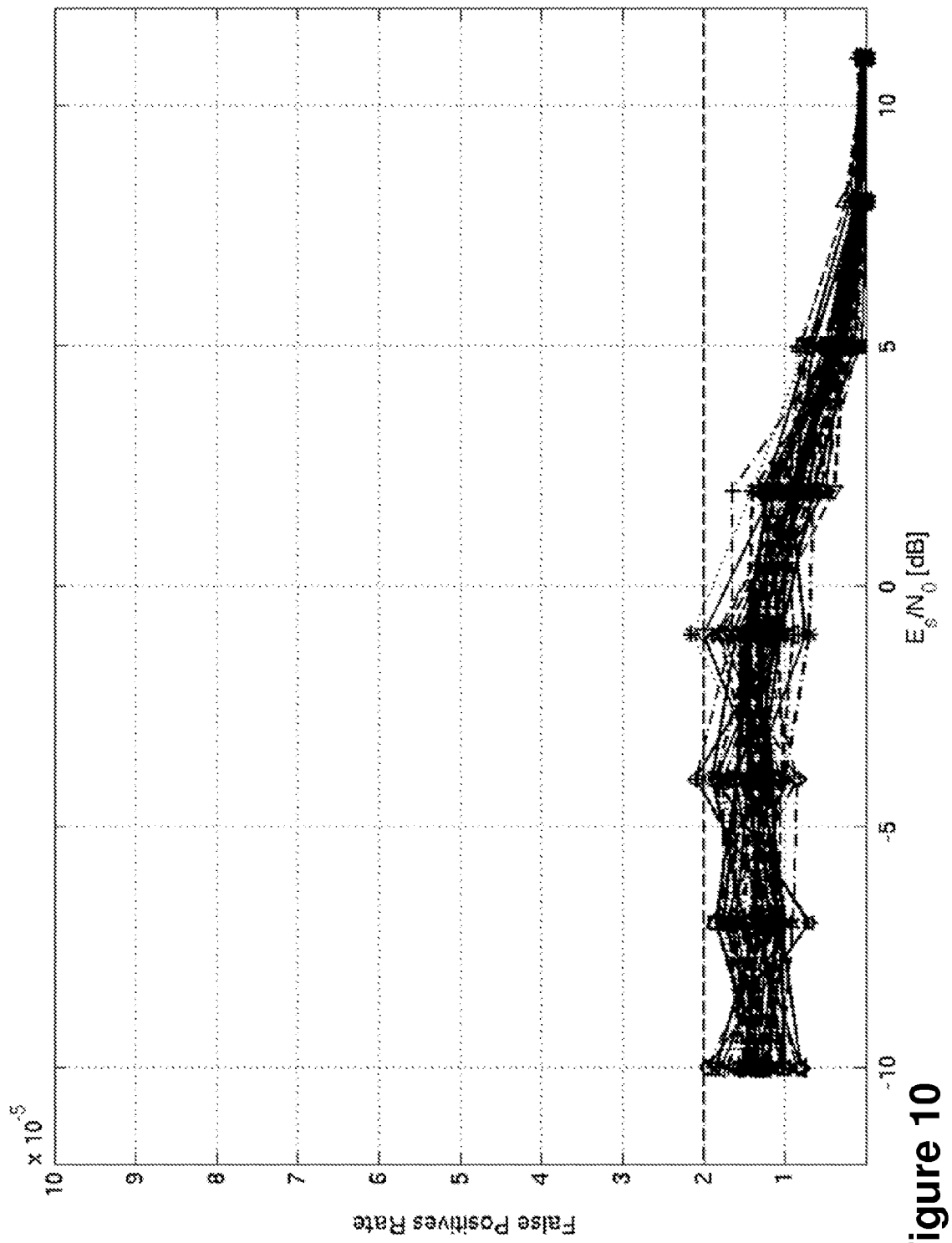
FIG. 10 is a graphical representation of the results of the simulations according to according to some embodiments.

FIG. 10 is a graphical representation of the results of the simulations according to scenario 5, with a 2 bit beacon bit pattern. That is, FIG. 10 is a graphical representation of the results obtained when a new eTFI capable MS assigned an eTFI pattern A receives a PACCH block intended for another eTFI capable MS, i.e. carrying an eTFI B different from A. The GERAN false positive rate requirement is met. Since the case of a 2 bit beacon bit pattern is good enough for this scenario, the 3 bit case and 4 bit case are not plotted or investigated.

Evaluation Results

Table 3 provides a description of the results of the simulations carried out in the different scenarios described in Table 2. According to the results, a 4 bit beacon bit pattern, e.g., all 1's, may be sufficient to address the objective of allowing MS discrimination of FIRE-encoded PACCH blocks, with an acceptable rate of false positives, whereby:

a) The beacon bit pattern may be XORed with PACCH block bit positions unique to the eTFI assigned to the intended recipient of the PACCH block.

b) The beacon bit pattern may be XORed with PACCH block bit positions unique to the case where the intended recipient of the PACCH block is not assigned an eTFI.

TABLE 3

Evaluation of Scenarios provided in Table 2

| Scenario | Description |
|---|---|
| 1 | Reference |
| 2 | It may be seen that for the chosen bit positions, a beacon bit pattern of 4 bits, all 1's, may be needed to ensure the same false positives performance as for non-eTFI capable MSs when subject to RLC data blocks with XORed eTFI |
| 3 | A four bit long beacon bit pattern, all 1's, may be sufficient |
| 4 | A four bit beacon bit pattern, all 1's, may still degrade the false positives performance somewhat compared to the reference case but the increase in false positives is seen as acceptable |
| 5 | A two bit beacon bit pattern, all 1's, may already be sufficient to ensure acceptable false positives performance. More bits in the beacon bit pattern may only be expected to improve performance. |

It has been seen that the currently accepted approach on eTFI expansion for PACCH blocks is not satisfactory when eTFI is used both at the transmitter and receiver, but when different values are used. A slight modification is described herein, where a 4 bit long pattern is XORed with the parity bits.

This may ensure that false positives are kept below the current performance requirement of $2^{e-5}$ irrespective of scenario, supporting all possible combinations of legacy MSs and MSs assigned an eTFI.

According to the foregoing, in some embodiments, the number of bits comprising the selected set of bit positions in Action 501 is determined by an error correction capability corresponding to a radio block encoding technique used by the first device 101. For example, the radio block encoding technique may be the FIRE code.

Hence, in some particular embodiments, and according to the results of the simulations just presented, the selected set of bit positions comprises 4 bits.

In some embodiments, at least two of the bits within the selected set of bit positions are distributed over a distance being equal to or exceeding a shortest uncorrectable burst error length applicable to the corresponding radio block encoding technique, that is, the radio block technique used by the first device 101. Based on the requirement in GERAN that when exposed to a random input signal "the overall reception performance shall be such that no more than 0.002% of the frames are assessed to be error free", the shortest uncorrectable burst error length may be 17 bits.

The selected set of bit positions may be located within parity bit positions of the encoded radio block. However, embodiments herein are not only applicable to a method being applied to the parity bits but may also be applied to other parts of the transmitted/received block.

Also, in some embodiments, each bit in the pre-determined bit pattern is set to 1.

Action 503

In this action, the first device 101 then sends the modified encoded radio block to the second device 102. This may be performed over the radio link 130.

Figure 11:
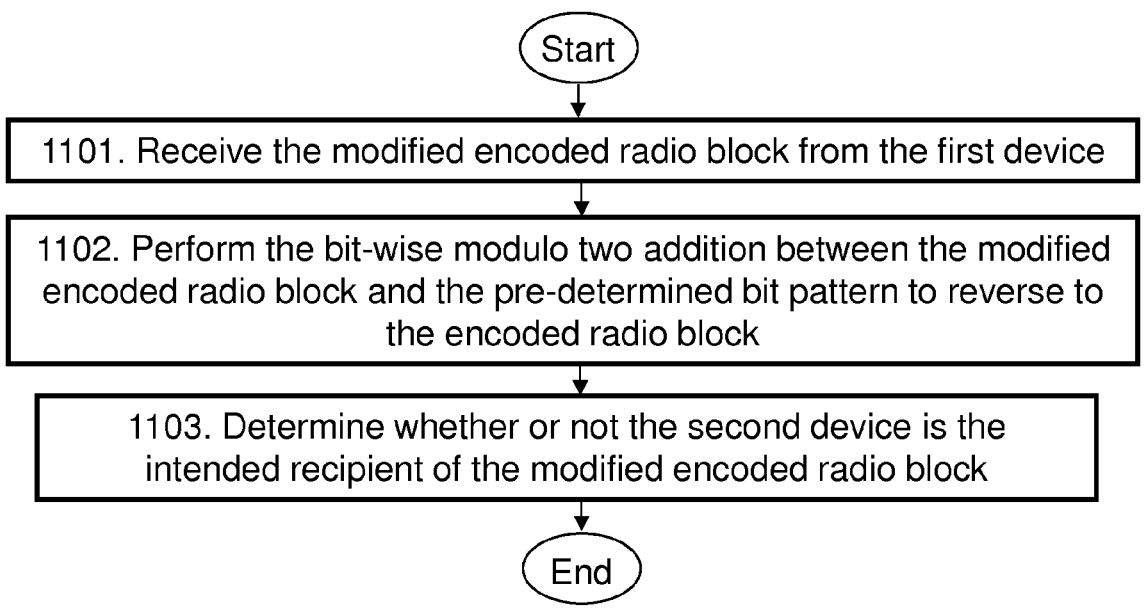
FIG. 11 is a schematic block diagram illustrating embodiments of a method in a second device, according to embodiments herein.

Embodiments of a method performed by the second device 102 for determining whether the second device 102 is the intended recipient of a modified encoded radio block, sent by a first device 101, will now be described with reference to the flowchart depicted depicted in FIG. 11. The first device 101 and the second device 102 operating in a wireless communications network 100. FIG. 11 depicts a flowchart of the actions that are or may be performed by the second device 102 in embodiments herein.

Action 1101

In this action, the second device 102 receives the modified encoded radio block from the first device 101, for example, through the radio link 130.

In some embodiments, the encoded radio block is a PACCH block.

Action 1102

In order to allow the second device 102, monitoring a packet data resource, to discriminate encoded radio blocks sent by the first device 101 on such resource, that is, in order for the second device 102 to correctly conclude if it is the intended recipient of the radio block, the second device 102 performs a bit-wise modulo-2-addition, i.e., XORing, between the modified encoded radio block and a pre-determined bit pattern, to reverse the modulo-2-addition performed by the first device 101 on the encoded radio block corresponding to the modified encoded radio block. That is, the second device 102 performs a bit-wise modulo-2-addition between the modified encoded radio block and the same pre-determined bit pattern used by the first device 101 when creating the modified encoded radio block, to recover the encoded radio block.

The bit-wise modulo-2-addition is performed in accordance with the eTFI assigned to the second device 102 so that the bit-wise modulo-2-addition is performed between a selected set of bit positions of the modified encoded radio block and the pre-determined pattern, wherein the selected set of bit positions is unique to a value of the eTFI assigned to the second device 102, as explained earlier in Action 501.

The characteristics of the selected set of bit positions are the same as those described earlier.

Thus, the number of bits comprising the selected set of bit positions is determined by an error correction capability corresponding to a radio block encoding technique used by the first device 101.

In some embodiments, the selected set of bit positions may comprise 4 bits.

At least two of the bits within the selected set of bit positions may be distributed over a distance being equal to or exceeding the shortest uncorrectable burst error length applicable to the corresponding radio block encoding technique.

In some embodiments, the selected set of bit positions are located within parity bit positions of the encoded radio block.

Also, the characteristics of the pre-determined bit pattern are the same as those described earlier. Thus, each bit in the pre-determined bit pattern is set to 1.

Action 1103

In this action, the second device 102 then determines whether or not the second device 102 is the intended recipient of the modified encoded radio block. The determining comprises decoding the encoded radio block after performing the bit-wise modulo-2-addition. That is, the determining comprises successful decoding of the encoded radio block after performing the bit-wise modulo-2-addition.

If the second device 102 is unable to successfully decode the block after performing the bit-wise modulo-2-addition, the second device 102 concludes that it is not the intended recipient of the radio block. If the second device 102, after performing the bit-wise modulo-2-addition, successfully decodes the radio block, the second device 102 determines that it is the intended recipient of the decoded radio block, if a TFI field in a header of the decoded radio block matches a TFI assigned to the second device 102.

An illustrative example of the method just presented will now be described for a FIRE-encoded PACCH block in a GERAN network.

Certain bit positions in the PACCH block, selected by the first device 101 according to Action 501, may be XORed according to Action 502, with an all 1's beacon bit pattern, where at least 2 of the beacon bits are distributed over a distance being equal to or exceeding the shortest uncorrectable burst error length b, e.g., 17 bits. As stated earlier, XORing may also be referred to as performing a bit-wise modulo two (2) addition.

The bit positions within a FIRE-encoded PACCH block used for XORing the beacon bit pattern will be eTFI specific. This means that $2^N$, where N is the number of eTFI bits, unique sets of bit positions within a FIRE-encoded PACCH block may be used when XORing the all 1's beacon bit pattern, i.e., a unique set for each of the N assignable eTFI values. Considering that unique sets of bit positions may be used for each eTFI value, the need for eTFI itself to be XORed into other bit positions, i.e., bit positions other than those used for XORing of the beacon bits, of the FIRE-encoded PACCH block may be eliminated for the case where the target MS has been assigned an eTFI. The second device 102 is referred to as the target MS in the examples below.

This approach may ensure that:

a) If the target MS, i.e., the intended recipient of the PACCH block, is in a DLMC configuration with an assigned eTFI, and is multiplexed on the same PDCH resources with other MS in a DLMC configuration with an eTFI assignment, then only the target MS may be able to successfully decode the FIRE-encoded PACCH block.

b) If the target MS is in a DLMC configuration without an assigned eTFI and is multiplexed on the same PDCH resources with other MS in a DLMC configuration with an eTFI assignment, then the target MS may be able to successfully decode the FIRE-encoded PACCH block, i.e. without performing any XORing, whereas the other MS, i.e., the unintended recipients, may introduce uncorrectable bit errors into the received PACCH block when performing XORing according to their assigned eTFI values.

c) If the target MS is in a DLMC configuration without an assigned eTFI, and is multiplexed on the same PDCH resources with other MS in a DLMC configuration without an eTFI assignment, then all MS may be able to successfully decode the FIRE-encoded PACCH block. In this case, the target MS may look at the TFI field of the PACCH block header to determine that it is the intended recipient of that PACCH block.

As such, upon reception of a FIRE-encoded PACCH block, a MS in a DLMC configuration with an assigned eTFI may always be aware of which bit positions in that FIRE-encoded PACCH block it may use to perform XORing in an attempt to reverse the XORing operation performed by the BSS. If it is unable to successfully decode the PACCH block after performing the XORing then it may conclude it is not the intended recipient of that PACCH block. If it successfully decodes the PACCH block after performing the XORing then it may look at the TFI field in the header of that PACCH block and conclude it is the intended recipient if the TFI value in that field matches its assigned TFI.

Further it should be noted that embodiments herein may be applicable in the DL as well as in the UL.

Furthermore, embodiments herein are not limited to GERAN. They are applicable to all types of error correcting codes with pre-determined capabilities, e.g., FIRE-code with the error correcting capability as described above.

An advantage of embodiments herein is that they outline a general method for signaling an information field, e.g., a beacon bit pattern within the context of an error correcting code-encoded radio block to meet the objective of allowing device discrimination of error correcting code-encoded radio blocks sent on a packet data resource monitored by multiple DLMC capable devices. For example, embodiments herein outline a general method for signaling an information field within the context of a FIRE-encoded PACCH block to meet the objective of allowing MS discrimination of FIRE-encoded PACCH blocks sent on a packet data resource monitored by multiple DLMC capable MS. In terms of GERAN, embodiments herein provide a backwards compatible extension of the TFI addressing space applicable to FIRE-encoded PACCH blocks.

Embodiments herein may be used to ensure a low rate of false positives for all combinations of MS types, such as MS not supporting DLMC, DLMC capable MS supporting the eTFI feature, DLMC capable MS not supporting the eTFI feature, on the same physical resources.

To perform the method actions described above in relation to FIG. 5, the first device 101 is configured to send a modified encoded radio block to the second device 102. The first device 101 may comprise the following arrangement depicted in FIG. 12. As already mentioned, the first device 101 and the second device 102 are configured to operate in the wireless communications network 100.

The detailed description of some of the following corresponds to the same references provided above, in relation to the actions described for the first device 101, and will thus not be repeated here.

The first device 101 is further configured to, e.g., by means of a selecting module 1201 configured to, select the set of bit positions of the encoded radio block, wherein the encoded radio block has the second device 102 as intended recipient, wherein the set of bit positions is unique to the value of the extended eTFI assigned to the second device 102, or wherein the set of bit positions is unique to a case in which no eTFI has been assigned to the second device 102. The selecting module 1201 may be the processor 1204 of the first device 101.

The encoded radio block may be a PACCH block.

In some embodiments, the number of bits comprising the selected set of bit positions is configured to be determined by an error correction capability corresponding to the radio block encoding technique configured to be used by the first device 101.

The selected set of bit positions may comprise 4 bits.

In some embodiments, at least two of the bits within the selected set of bit positions are configured to be distributed over a distance being equal to or exceeding the shortest uncorrectable burst error length applicable to the corresponding radio block encoding technique.

The selected set of bit positions may be configured to be located within parity bit positions of the encoded radio block.

The first device 101 is further configured to, e.g., by means of a performing module 1202 configured to, perform the modulo-2-addition of the selected set of bit positions of the encoded radio block with the pre-determined bit pattern, to obtain the modified encoded radio block. The performing module 1202 may be the processor 1204 of the first device 101.

In some embodiments, each bit in the pre-determined bit pattern is set to 1.

The first device 101 is further configured to, e.g., by means of a sending module 1203 configured to, send the modified encoded radio block to the second device 102. The sending module 1201 may be the processor 1204 of the first device 101.

Figure 12:
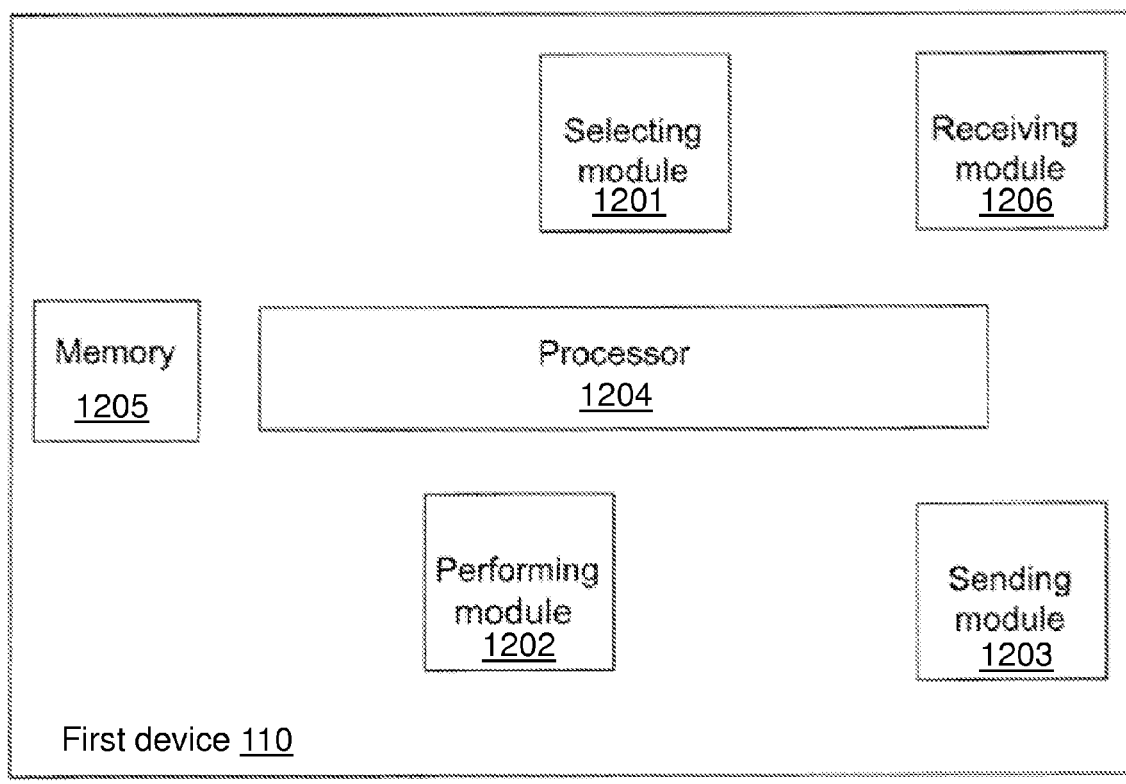
FIG. 12 is a schematic block diagram illustrating embodiments of a first device, according to embodiments herein.

The embodiments herein for the first device 101 to send a modified encoded radio block to the second device 102 may be implemented through one or more processors, such as the processor 1204 in the first device 101 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the in the first device 101. One such carrier may be in the form of a CD ROM disc. It is however feasible with other data carriers such as a memory stick. The computer program code may furthermore be provided as pure program code on a server and downloaded to the first device 101. Hence, in some embodiments, the selecting module 1201, the performing module 1202, and the receiving module 1206 described above may be implemented as one or more applications running on one or more processors such as the processor 1204. That is, the methods according to the embodiments described herein for the first device 101 may be respectively implemented by means of a computer program product, comprising instructions, i.e., software code portions, which, when executed on at least one processor, cause the at least one processor to carry out the actions described herein, as performed by the first device 101. The computer program product may be stored on a computer-readable storage medium. The computer-readable storage medium, having stored thereon the computer program, may comprise instructions which, when executed on at least one processor, cause the at least one processor to carry out the actions described herein, as performed by the first device 101. In some embodiments, the computer-readable storage medium may be a non-transitory computer-readable storage medium, such as a CD ROM disc, or a memory stick. In other embodiments, the computer program product may be stored on a carrier containing the computer program of the previous claim, wherein the carrier is one of an electronic signal, optical signal, radio signal, or the computer-readable storage medium, as described above.

The first device 101 may further comprise a memory 1205 comprising one or more memory units. The memory is arranged to be used to store obtained information, store data, configurations, schedulings, and applications etc. to perform the methods herein when being executed in the first device 101.

In some embodiments, information e.g., from the second device 102, may be received through a receiving module 1206. The receiving module 1206 may be in communication with the processor 1204. The receiving module 1206 may also be configured to receive other information.

The processor 1204 may be further configured to send messages, e.g., to the second device 102, through the sending module 1203, which may be in communication with the processor 1204, and the memory 1205.

Those skilled in the art will also appreciate that the selecting module 1201, performing module 1202, receiving module 1206 and sending module 1203 described above may refer to a combination of analog and digital circuits, and/or one or more processors configured with software and/or firmware, e.g. stored in the memory, that when executed by the one or more processors such as the processors in the first device 101 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

To perform the method actions described above in relation to FIG. 11, the second device 102 is configured to determine whether the second device 102 is the intended recipient of the modified encoded radio block, configured to be sent by the first device 101. The first device 101 may comprise the following arrangement depicted in FIG. 13. As already mentioned, the first device 101 and the second device 102 are configured to operate in the wireless communications network 100.

The detailed description of some of the following corresponds to the same references provided above, in relation to the actions described for the second device 102, and will thus not be repeated here.

The second device 102 is further configured to, e.g., by means of a receiving module 1301 configured to, receive the modified encoded radio block from the first device 101. The receiving module 1301 may be the processor 1304 of the second device 102.

The encoded radio block may be a PACCH block.

The second device 102 is further configured to, e.g., by means of a performing module 1302 configured to, perform a bit-wise modulo-2-addition between the modified encoded radio block and the pre-determined bit pattern, to reverse the modulo-2-addition performed by the first device 101 on the encoded radio block corresponding to the modified encoded radio block, wherein the bit-wise modulo-2-addition is configured to be performed in accordance with the eTFI assigned to the second device 102, so that the bit-wise modulo-2-addition is performed between the selected set of bit positions of the modified encoded radio block and the pre-determined pattern, wherein the selected set of bit positions is unique to the value of the eTFI assigned to the second device 102. The performing module 1302 may be the processor 1304 of the second device 102.

In some embodiments, each bit in the pre-determined bit pattern is set to 1.

In some embodiments, the number of bits comprising the selected set of bit positions is configured to be determined by the error correction capability corresponding to the radio block encoding technique configured to be used by the first device 101.

The selected set of bit positions may comprise 4 bits.

In some embodiments, at least two of the bits within the selected set of bit positions are configured to be distributed over a distance being equal to or exceeding the shortest uncorrectable burst error length applicable to the corresponding radio block encoding technique.

The selected set of bit positions may be configured to be located within parity bit positions of the encoded radio block.

The second device 102 is further configured to, e.g., by means of a determining module 1303 configured to, determine whether or not the second device 102 is the intended recipient of the modified encoded radio block, wherein to determine comprises decoding the encoded radio block after performing the bit-wise modulo-2-addition. That is, to determine comprises to successfully decode the encoded radio block after having performed the bit-wise modulo-2-addition. The determining module 1303 may be the processor 1304 of the second device 102.

In some embodiments, the second device 102 may be configured to decode by means of a decoding module 1307, which decoding module 1307 may be the processor 1304 of the second device 102.

In some embodiments, the second device 102 is configured to conclude that it is not the intended recipient of the radio block if the second device 102 is unable to successfully decode the block after performing the bit-wise modulo-2-addition, and the second device 102 is configured to determine that it is the intended recipient of the decoded radio block if the second device 102, after performing the bit-wise modulo-2-addition, successfully decodes the radio block, and if the TFI field in the header of the decoded radio block matches the TFI assigned to the second device 102.

Figure 13:
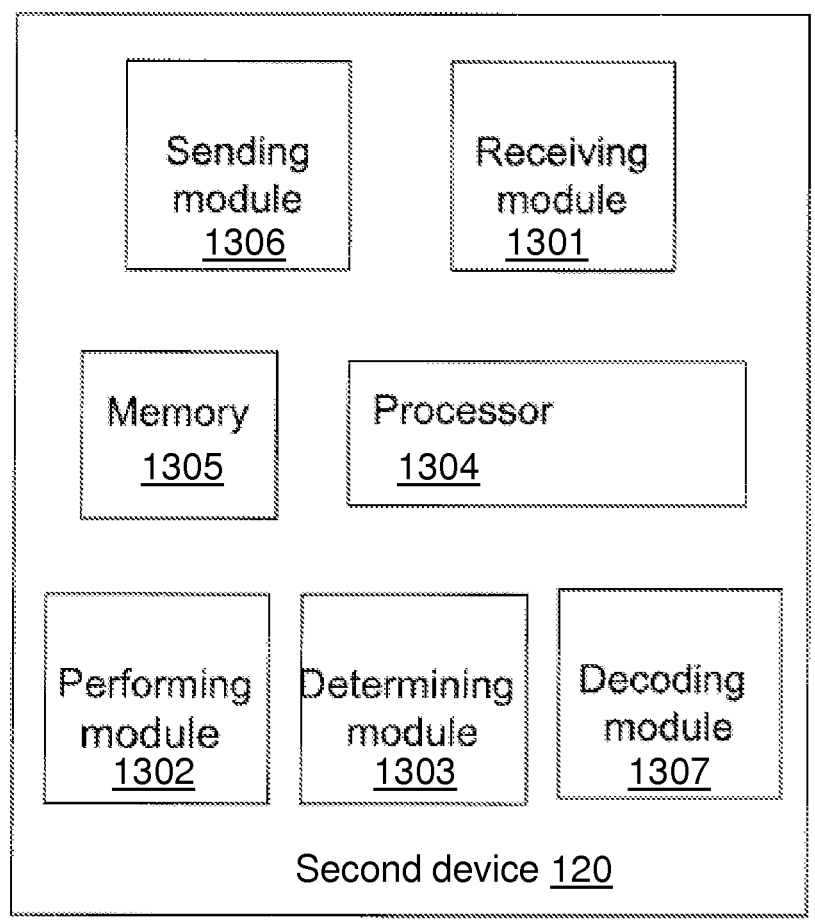
FIG. 13 is a schematic block diagram illustrating embodiments of a second device, according to embodiments herein.

The embodiments herein for the second device 102 to determine whether the second device 102 is the intended recipient of the modified encoded radio block sent by the second device 102 may be implemented through one or more processors, such as the processor 1304 in the second device 102 depicted in FIG. 13, together with computer program code for performing the functions and actions of the embodiments herein. The program code mentioned above may also be provided as a computer program product, for instance in the form of a data carrier carrying computer program code for performing the embodiments herein when being loaded into the in the second device 102. One such carrier may be in the form of a CD ROM disc. It is however feasible with other data carriers such as a memory stick. The computer program code may furthermore be provided as pure program code on a server and downloaded to the second device 102. Hence, in some embodiments, the receiving module 1301, the performing module 1302, and the determining module 1303 described above may be implemented as one or more applications running on one or more processors such as the processor 1304. That is, the methods according to the embodiments described herein for the second device 102 may be respectively implemented by means of a computer program product, comprising instructions, i.e., software code portions, which, when executed on at least one processor, cause the at least one processor to carry out the actions described herein, as performed by the second device 102. The computer program product may be stored on a computer-readable storage medium. The computer-readable storage medium, having stored thereon the computer program, may comprise instructions which, when executed on at least one processor, cause the at least one processor to carry out the actions described herein, as performed by the second device 102. In some embodiments, the computer-readable storage medium may be a non-transitory computer-readable storage medium, such as a CD ROM disc, or a memory stick. In other embodiments, the computer program product may be stored on a carrier containing the computer program of the previous claim, wherein the carrier is one of an electronic signal, optical signal, radio signal, or the computer-readable storage medium, as described above.

The second device 102 may further comprise a memory 1305 comprising one or more memory units. The memory 1305 is arranged to be used to store obtained information, store data, configurations, schedulings, and applications etc. to perform the methods herein when being executed in the second device 102.

In some embodiments, information e.g., from the first device 101, may be received through the receiving module 1301. The receiving module 1301 may be in communication with the processor 1304. The receiving module 1301 may also be configured to receive other information.

The processor 1304 may be further configured to send messages, e.g., to the first device 101, through a sending module 1306, which may be in communication with the processor 1304, and the memory 1305.

Those skilled in the art will also appreciate that the receiving module 1301, performing module 1302, sending module 1306 and determining module 1303 described above may refer to a combination of analog and digital circuits, and/or one or more processors configured with software and/or firmware, e.g. stored in the memory, that when executed by the one or more processors such as the processors in the second device 102 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

Further Exemplary Embodiments

Several embodiments are described herein.

Figure 14:
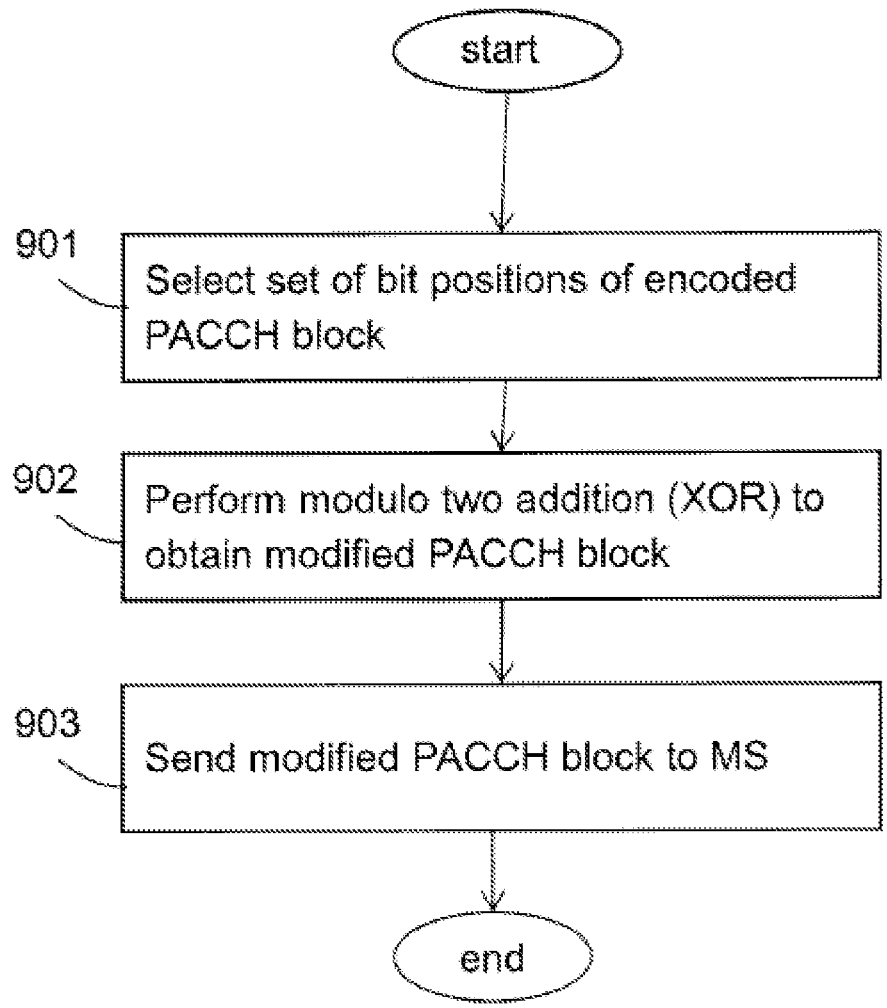
FIG. 14 is a schematic block diagram illustrating embodiments of a method in a network node, according to embodiments herein.
Figure 15:
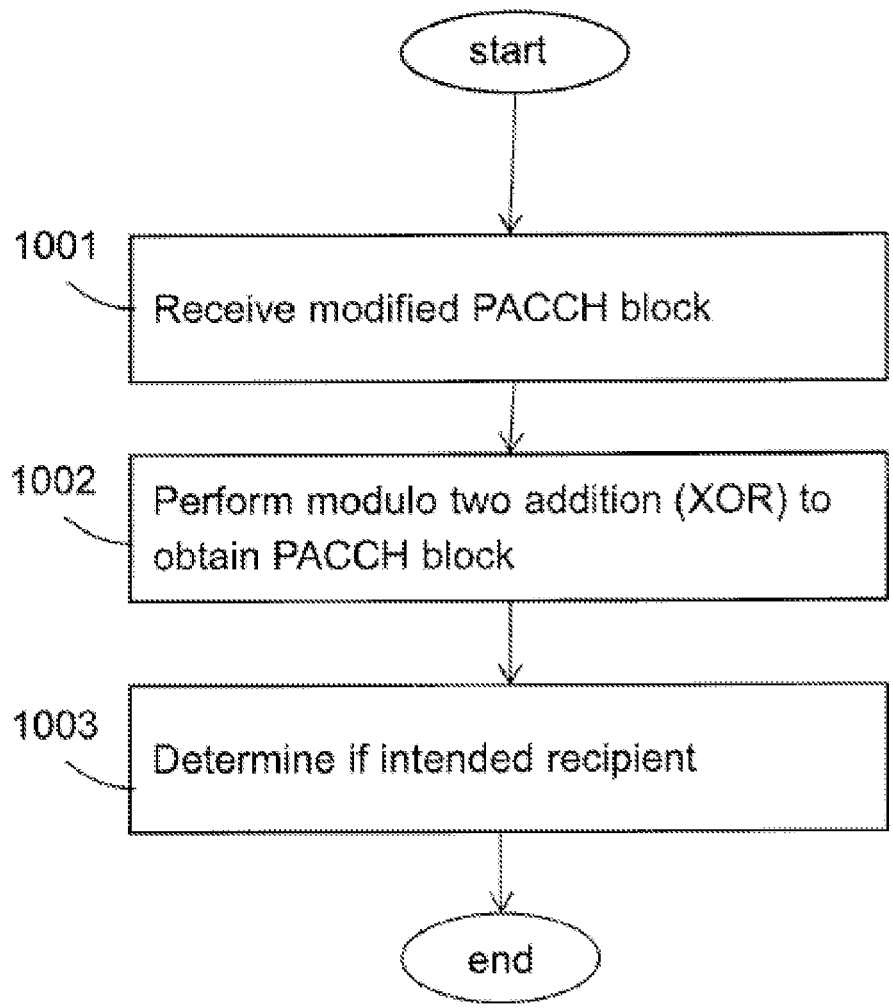
FIG. 15 is a schematic block diagram illustrating embodiments of a method in a MS, according to embodiments herein.
Figure 16:
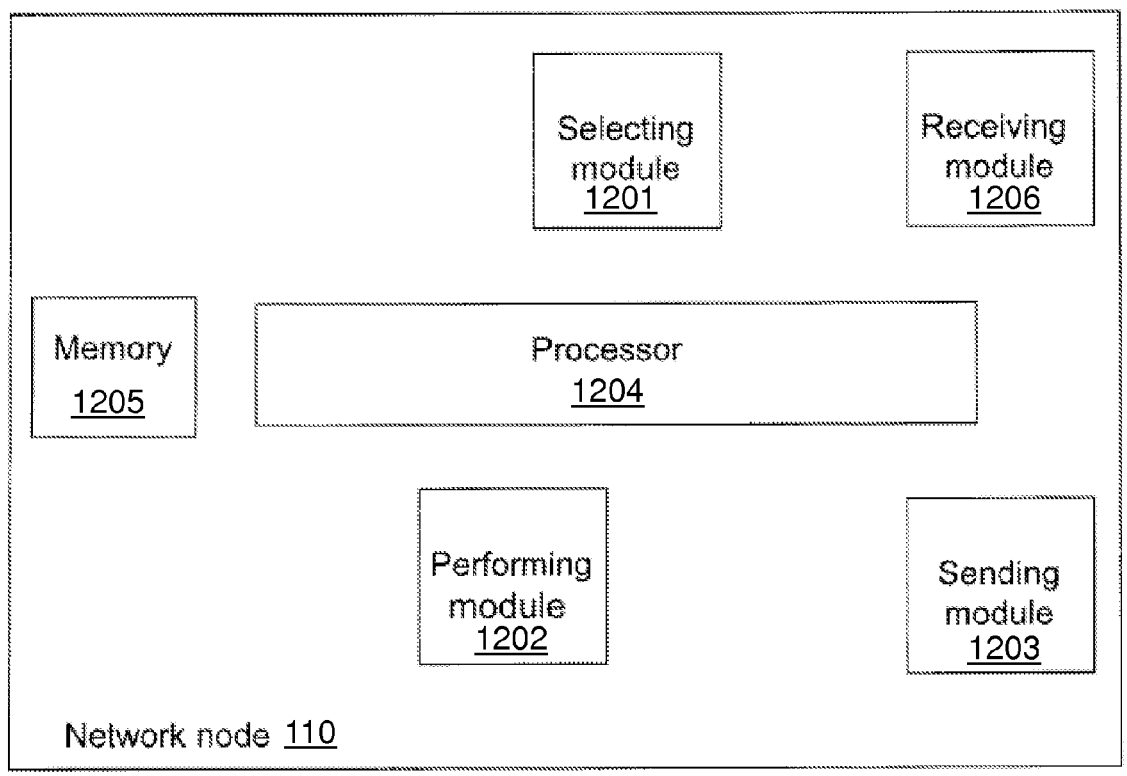
FIG. 16 is a schematic block diagram illustrating embodiments of a network node, according to embodiments herein.

More specifically, the following are network node and MS related embodiments:

The network node embodiments relate to FIGS. 14 and 16. The MS embodiments relate to FIGS. 15 and 17.

A method in a network node such as the network node 110 serving a MS such as the MS 120 may comprise the actions of:

Selecting 901 a set of bit positions of an encoded PACCH block, wherein the encoded PACCH block has the MS 120 as intended recipient, wherein the set of bit positions is unique to a value of an extended Temporary Flow Identifier, eTFI, assigned to the MS 120 or wherein the set of bit positions is unique to a case in which no eTFI has been assigned to the MS. This action may be performed by a selecting module 1201 within the network node such as the network node 110. The set of bit positions selected in the case where no eTFI has been assigned to the MS may be empty.

Performing 902 a modulo-2-addition of the selected set if bit positions of the encoded PACCH block with a pre-determined bit pattern, to obtain a modified PACCH block. This action may be performed by a performing module 1202 within the network node such as the network node 110.

Sending 903 the modified PACCH block to the MS 120. This action may be performed by a sending module 1203 within the network node such as the network node 110.

A method in a MS such as the MS 120 served by a network node such as the network node 110 comprises the actions of:

Receiving 1001 a modified PACCH block from the network node 110. This action may be performed by a receiving module 1301 within the MS such as the MS 120.

Performing 1002 a bit-wise modulo-2-addition between the modified PACCH block and a predetermined bit pattern, to obtain a PACCH block. The bit-wise modulo-2-addition may be performed in accordance with an eTFI assigned to the MS 120. This action may be performed by a performing module 1302 within the MS such as the MS 120.

Determining 1003 whether the MS 120 is the intended recipient of the modified PACCH block. This action may be performed by a determining module 1303 within the MS such as the MS 120.

The determining may comprise decoding the modified PACCH block after performing the bit-wise modulo-2-addition. If the MS is unable to successfully decode the PACCH block after performing the bit-wise modulo-2-addition, it may conclude that it is not the intended recipient of the PACCH block. If it successfully decodes the PACCH block, it may assume that it is the intended recipient of the PACCH block if a TFI field in a header of the PACCH block matches a TFI assigned to the MS 120. The decoding may be performed by a decoding module 1307 within the MS such as the MS 120.

Figure 17:
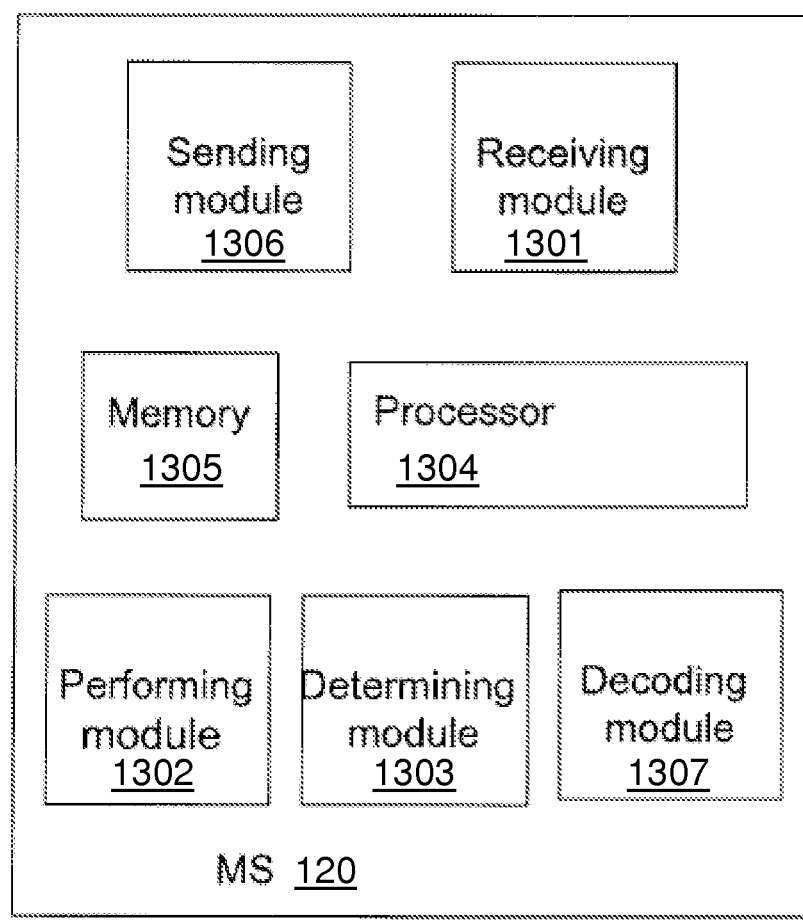
FIG. 17 is a schematic block diagram illustrating embodiments of a MS, according to embodiments herein.

The embodiments herein may be implemented through one or more processors, such as a processor in the network node 110 depicted in FIG. 16, and a processor in the MS 120 depicted in FIG. 17, together with computer program code for performing the functions and actions of the embodiments herein. The program code mentioned above may also be provided as a computer program product, for instance in the form of a data carrier carrying computer program code for performing the embodiments herein when being loaded into the in the network node 110 or the MS 120. One such carrier may be in the form of a CD ROM disc. It is however feasible with other data carriers such as a memory stick. The computer program code may furthermore be provided as pure program code on a server and downloaded to the network node 110 or the MS 120.

The network node 110 and the MS 120 may further comprise a memory comprising one or more memory units. The memory is arranged to be used to store obtained information, store data, configurations, schedulings, and applications etc. to perform the methods herein when being executed in the network node 110 or the MS 120.

The MS 120 may comprise an interface unit to facilitate communications between the MS 120 and other nodes or devices, e.g., the network node 110. The interface may, for example, include a transceiver configured to transmit and receive radio signals over an air interface in accordance with a suitable standard.

Those skilled in the art will also appreciate that the selecting module 1201, performing module 1202, 1302, determining module 1303, decoding module 1307, receiving module 1206, 1301 and sending module 1203, 1306 described above may refer to a combination of analog and digital circuits, and/or one or more processors configured with software and/or firmware, e.g. stored in the memory, that when executed by the one or more processors such as the processors in the network node 110 and MS 120 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

FIG. 14 discloses method actions according to some embodiments performed in the network node 110, as described above.

FIG. 15 discloses method actions according to some embodiments performed in the MS 120, as described above.

FIG. 16 discloses embodiments of the network node 110, as described above.

FIG. 17 discloses embodiments of the MS 120, as described above.

The invention claimed is:

1. A method performed by a first device for sending a modified encoded radio block to a second device, the first device and the second device operating in a wireless communications network, the method comprising:
   selecting a set of bit positions of an encoded radio block, wherein the encoded radio block has the second device as intended recipient, wherein the set of bit positions is unique to a value of an extended Temporary Flow Identifier, eTFI, assigned to the second device, or wherein the set of bit positions is unique to a case in which no eTFI has been assigned to the second device,
   performing a modulo-2-addition of the selected set of bit positions of the encoded radio block with a pre-determined bit pattern, to obtain a modified encoded radio block, and
   sending the modified encoded radio block to the second device.

2. The method of claim 1, wherein the number of bits comprising the selected set of bit positions is determined by an error correction capability corresponding to a radio block encoding technique used by the first device.

3. The method of claim 1, wherein the selected set of bit positions comprises 4 bits.

4. The method of claim 1, wherein at least two of the bits within the selected set of bit positions are distributed over a distance being equal to or exceeding a shortest uncorrectable burst error length applicable to the corresponding radio block encoding technique.

5. The method of claim 1, wherein the encoded radio block is a Packet Associated Control Channel, PACCH, block.

6. The method of claim 1, wherein the selected set of bit positions are located within parity bit positions of the encoded radio block.

7. The method of claim 1, wherein each bit in the pre-determined bit pattern is set to 1.

8. A method performed by a second device for determining whether the second device is the intended recipient of a modified encoded radio block, sent by a first device, the first device and the second device operating in a wireless communications network, the method comprising:
receiving a modified encoded radio block from the first device,
performing, a bit-wise modulo-2-addition between the modified encoded radio block and a pre-determined bit pattern, to reverse a modulo-2-addition performed by the first device on an encoded radio block corresponding to the modified encoded radio block, wherein the bit-wise modulo-2-addition is performed in accordance with an extended Temporary Flow Identifier, eTFI, assigned to the second device so that the bit-wise modulo-2-addition is performed between a selected set of bit positions of the modified encoded radio block and the pre-determined pattern, wherein the selected set of bit positions is unique to a value of the eTFI assigned to the second device, and
determining whether or not the second device is the intended recipient of the modified encoded radio block, wherein the determining comprises decoding the encoded radio block after performing the bit-wise modulo-2-addition.

9. The method of claim 8, wherein if the second device is unable to successfully decode the block after performing the bit-wise modulo-2-addition, the second device concludes that it is not the intended recipient of the radio block, and wherein if the second device, after performing the bit-wise modulo-2-addition, successfully decodes the radio block, the second device determines that it is the intended recipient of the decoded radio block if a Temporary Flow Identifier, TFI, field in a header of the decoded radio block matches a TFI assigned to the second device.

10. The method of claim 8, wherein the number of bits comprising the selected set of bit positions is determined by an error correction capability corresponding to a radio block encoding technique used by the first device.

11. The method of claim 8, wherein the selected set of bit positions comprises 4 bits.

12. The method of claim 8, wherein at least two of the bits within the selected set of bit positions are distributed over a distance being equal to or exceeding a shortest uncorrectable burst error length applicable to the corresponding radio block encoding technique.

13. The method of claim 8 wherein the encoded radio block is a Packet Associated Control Channel, PACCH, block.

14. The method of claim 8, wherein the selected set of bit positions are located within parity bit positions of the encoded radio block.

15. The method of claim 8, wherein each bit in the pre-determined bit pattern is set to 1.

16. A first device configured to send a modified encoded radio block to a second device, the first device and the second device being configured to operate in a wireless communications network, the first device being further configured to:
select a set of bit positions of an encoded radio block, wherein the encoded radio block has the second device as intended recipient, wherein the set of bit positions is unique to a value of an extended Temporary Flow Identifier, eTFI, assigned to the second device, or wherein the set of bit positions is unique to a case in which no eTFI has been assigned to the second device,
perform a modulo-2-addition of the selected set of bit positions of the encoded radio block with a pre-determined bit pattern, to obtain a modified encoded radio block, and
send the modified encoded radio block to the second device.

17. The first device of claim 16, wherein the number of bits comprising the selected set of bit positions is configured to be determined by an error correction capability corresponding to a radio block encoding technique configured to be used by the first device.

18. The first device of claim 16, wherein the selected set of bit positions comprises 4 bits.

19. The first device of claim 16, wherein at least two of the bits within the selected set of bit positions are configured to be distributed over a distance being equal to or exceeding a shortest uncorrectable burst error length applicable to the corresponding radio block encoding technique.

20. The first device of claim 16, wherein the encoded radio block is a Packet Associated Control Channel, PACCH, block.

21. The first device of claim 16, wherein the selected set of bit positions are configured to be located within parity bit positions of the encoded radio block.

22. The first device of claim 20, wherein each bit in the pre-determined bit pattern is set to 1.

23. A second device configured to determine whether the second device is the intended recipient of a modified encoded radio block, configured to be sent by a first device, the first device and the second device being configured to operate in a wireless communications network, the second device being further configured to:
receive a modified encoded radio block from the first device,
perform a bit-wise modulo-2-addition between the modified encoded radio block and a pre-determined bit pattern, to reverse a modulo-2-addition configured to be performed by the first device on an encoded radio block corresponding to the modified encoded radio block, wherein the bit-wise modulo-2-addition is configured to be performed in accordance with an extended Temporary Flow Identifier, eTFI, assigned to the second device so that the bit-wise modulo-2-addition is performed between a selected set of bit positions of the modified encoded radio block and the pre-determined pattern, wherein the selected set of bit positions is unique to a value of the eTFI assigned to the second device, and
determine whether or not the second device is the intended recipient of the modified encoded radio block, wherein to determine comprises decoding the encoded radio block after performing the bit-wise modulo-2-addition.

24. The second device of claim 23, wherein the second device is configured to conclude that it is not the intended recipient of the radio block if the second device is unable to successfully decode the block after performing the bit-wise modulo-2-addition, and wherein the second device is configured to determine that it is the intended recipient of the decoded radio block if the second device, after performing the bit-wise modulo-2-addition, successfully decodes the radio block, and if a Temporary Flow Identifier, TFI, field in a header of the decoded radio block matches a TFI assigned to the second device.

25. The second device of claim 23, wherein the number of bits comprising the selected set of bit positions is configured to be determined by an error correction capability corresponding to a radio block encoding technique configured to be used by the first device.

26. The second device of claim 23, wherein the selected set of bit positions comprises 4 bits.

27. The second device of claim 23, wherein at least two of the bits within the selected set of bit positions are configured to be distributed over a distance being equal to or exceeding a shortest uncorrectable burst error length applicable to the corresponding radio block encoding technique.

28. The second device of claim 23 wherein the encoded radio block is a Packet Associated Control Channel, PACCH, block.

29. The second device of claim 23, wherein the selected set of bit positions configured to be located within parity bit positions of the encoded radio block.

30. The second device of claim 23, wherein each bit in the pre-determined bit pattern is set to 1.

* * * * *